United States Patent
Varpilah et al.

(10) Patent No.: US 12,455,579 B2
(45) Date of Patent: Oct. 28, 2025

(54) LARGE-SCALE SOLAR TRACKER INSTALLATION CONTROL SYSTEM

(71) Applicant: OMCO Solar, LLC, Phoenix, AZ (US)

(72) Inventors: Lepolve Varpilah, Queen Creek, AZ (US); Steve Ouandji, Goodyear, AZ (US)

(73) Assignee: OMCO SOLAR, LLC, Phoenix, AZ (US)

( * ) Notice: Subject to any disclaimer, the term of this patent is extended or adjusted under 35 U.S.C. 154(b) by 0 days.

(21) Appl. No.: 18/629,771

(22) Filed: Apr. 8, 2024

(65) Prior Publication Data

US 2024/0255969 A1    Aug. 1, 2024

Related U.S. Application Data

(63) Continuation-in-part of application No. 17/746,322, filed on May 17, 2022, now Pat. No. 11,955,925.

(51) Int. Cl.
G05D 3/10 (2006.01)
H02S 20/32 (2014.01)
H02S 50/00 (2014.01)

(52) U.S. Cl.
CPC ............ *G05D 3/105* (2013.01); *H02S 20/32* (2014.12); *H02S 50/00* (2013.01)

(58) Field of Classification Search
CPC ......... G05D 3/105; H02S 20/32; H02S 50/00; Y02E 10/47; Y02E 10/50
See application file for complete search history.

(56) References Cited

U.S. PATENT DOCUMENTS

| | | | |
|---|---|---|---|
| 7,884,308 B1 | 2/2011 | Mejita | |
| 8,369,999 B2 | 2/2013 | Beck | |
| 8,939,648 B2 | 1/2015 | Schneider et al. | |
| 9,281,778 B2 | 3/2016 | Corio et al. | |
| 9,806,669 B2 | 10/2017 | De | |
| 10,415,974 B2 | 9/2019 | Judkins | |
| 10,541,644 B2 | 1/2020 | Arliaud et al. | |
| 10,557,646 B1 | 2/2020 | Ma et al. | |
| 10,917,037 B2 | 2/2021 | Remy et al. | |
| 10,944,354 B2 | 3/2021 | Ballentine et al. | |

(Continued)

*Primary Examiner* — Seung C Sohn
(74) *Attorney, Agent, or Firm* — George L. Pinchak; Watts Law, LLC

(57) ABSTRACT

A control system for a solar tracker assembly installation including a plurality of solar tracker assemblies, each of the plurality of solar tracker assemblies including a table supporting photovoltaic modules and rotatable through an angle of inclination. The solar tracker control system includes: a plurality of solar tracker controllers periodically outputting table angle of inclination data and solar tracker assembly operating data for the associated solar tracker assembly; a plurality of weather sensors, each outputting weather condition data; and an array controller in direct, wireless communications with each solar tracker controller and each weather sensor. The array controller analyzing communicated table angle of inclination data, the tracker operating data and the weather condition data and, as required, wirelessly communicating control signals to one or more solar tracker controllers of the plurality of solar tracker controllers to change a table angle of inclination of the one or more solar tracker assemblies.

29 Claims, 9 Drawing Sheets

(56) References Cited

U.S. PATENT DOCUMENTS

| | | | |
|---|---|---|---|
| 11,048,278 B2 | 6/2021 | Lee | |
| 11,205,992 B2 * | 12/2021 | Hegedus | H02S 20/10 |
| 11,271,518 B2 | 3/2022 | Ballentine et al. | |
| 11,300,979 B2 | 4/2022 | Kesler et al. | |
| 11,637,524 B2 * | 4/2023 | Searcy | G01S 3/7862 |
| | | | 136/244 |
| 11,703,887 B2 | 7/2023 | Morse et al. | |
| 2019/0204405 A1 | 7/2019 | Arliaud et al. | |
| 2020/0309893 A1 | 10/2020 | Arliaud et al. | |
| 2021/0141047 A1 | 5/2021 | Ma et al. | |

* cited by examiner

LARGE-SCALE SOLAR TRACKER INSTALLATION CONTROL SYSTEM

CROSS-REFERENCE TO RELATED APPLICATION

The present application is a continuation-in-part of pending U.S. non-provisional patent application Ser. No. 17/746,322, filed May 17, 2022, issuing as U.S. Pat. No. 11,955,925 on Apr. 9, 2024. U.S. non-provisional patent application Ser. No. 17/746,322 is incorporated by reference herein in its entirety for any and all purposes.

TECHNICAL FIELD

The present disclosure relates to a solar tracker control and communications system for use in a large-scale solar tracker installation having a plurality of solar tracker assemblies and a plurality of weather sensors, the control and communications system including a central controller or array controller which, via a wireless communications network, receives data from and transmits control signals to: a) a plurality of tracker controllers, each of the plurality of tracker controllers associated with a different respective solar tracker assembly of the plurality of solar tracker assemblies; and b) the plurality of weather sensors outputting weather condition data such as wind speed data at predetermined time intervals, the array controller may additionally transmit data to a cloud storage server for storage in an associated cloud storage database, allowing for remote access to stored data.

BACKGROUND

Large-scale solar tracker installations, sometimes referred to as "utility scale" solar tracker installations, may include several hundred up to several thousand horizontal, single axis solar tracker assemblies distributed across a geographic site or location. The installation site or location may be 100 acres or more in area. Each solar tracker assembly of a solar tracker installation includes a pivoting or rotatable table which is driven by a drive mechanism such that the solar tracker assembly table is rotated or pivoted through a predetermined angle of inclination range to track the position of the sun as the sun moves across the sky from east to west.

The table of each solar tracker assembly includes a torque tube beam, which may be several hundreds of feet in length and is generally oriented in a north-south direction. The torque tube beam may be comprised of a plurality of torque tube beam segments of predetermined length, i.e., 40-foot segments. For example, a first portion of the torque tube beam is coupled to one side of a rotating member of the slew drive while a second portion of the torque tube beam is coupled to an opposite side of the slew drive rotating member. The first portion of the torque tube beam may extend north from the slew drive and may be comprised of five, 40-foot torque tube beam segments, while the second portion of the torque tube beam may extend south from the slew drive and may similarly be comprised of five, 40-foot torque tube beam segments, thus providing a total north-south extent or length of the torque tube beam of 400 feet.

For a given solar tracker assembly, the torque tube beam supports a plurality of photovoltaic modules which are affixed along a longitudinal extent of the torque tube beam via a frame including a plurality of mounting brackets. The torque tube beam, in turn, is rotatably supported by a plurality of rotatable bearing assemblies of bearing apparatus positioned at spaced apart locations along the torque tube beam. The bearing apparatuses and the drive mechanism are affixed to spaced apart support posts along a length of the torque tube beam. The toque tube beam is generally horizontal, that is, the torque tube beam extends generally parallel to the ground or substrate in which the support posts are mounted, that is, the torque tube beam and, therefore, the solar tracker assembly table generally follows the contour of the land along and over which the torque tube extends.

The modules of the plurality of photovoltaic modules are typically spaced uniformly along the torque tube beam by mounting brackets associated with the frame. Each solar tracker assembly includes the pivoting table which is pivoted about an axis of rotation by the drive mechanism. The table includes everything that pivots or swings about an axis of rotation of the table. The table of a solar tracking system or assembly typically includes: a) the torque tube beam including a plurality of torque tube beam segments; b) the plurality of photovoltaic modules; c) the rotatable bearing assemblies of a plurality of the bearing apparatuses that support the torque tube beam along its length and pivot the torque tube beam about the axis of rotation of the table; and d) the frame which affixes or secures the plurality of photovoltaic modules to the torque tube beam. As noted above, the frame typically includes a number of mounting brackets for mounting the plurality of photovoltaic modules to the torque tube beam. Additional details regarding the structure and function of a horizontal, single axis solar tracker assembly are disclosed in U.S. Pat. No. 10,944,354 to Ballentine et al., issued Mar. 9, 2021 ("the '354 patent"), and U.S. Pat. No. 11,271,518 to Ballentine et al., issued Mar. 8, 2022 ("the '518 patent"), both of which are assigned to the assignee of the present application. Both the '354 patent and the '518 patent are incorporated by reference herein in their respective entireties.

Associated with each solar tracker assembly is a solar tracker controller. The solar tracker controller is operatively connected to the drive mechanism of the solar tracker assembly to move or pivot the table about the table axis of rotation such that light receiving surfaces of the photovoltaic modules are generally orthogonal to the position of the sun, within the limits of the angle of inclination range of the table of the solar tracking assembly, to track the sun as it moves across the sky. For example, when the sun is at its apex (high solar noon), the table would be pivoted such that the plurality of photovoltaic panels would typically be in a horizontal position for maximum sun exposure. This would correspond to a neutral position or zero angle of inclination of the table. Typically, the controller is physically located in proximity to the drive mechanism of the solar tracker assembly.

A solar tracker control system provides for data communications and operational control of the solar tracker installation. Some prior art solar tracker installations employed a "mesh" local area network communication and control architecture, such as the ZigBee communications protocol, in a machine-to-machine local area network. In a ZigBee local area network, a network control unit (NCU) (central controller) communicates wirelessly with nearby solar tracker controllers. In turn, the nearby solar tracker controllers communicate with other solar tracker controllers which are more distant from the NCU. Typically, a NCU may service up to 200 solar tracker assemblies by communicating with the respective solar tracker controllers. While a mesh local area network utilizing an NCU for machine-to-machine communications may be suitable for smaller solar tracker assembly installations of 200 solar tracker assemblies or less, for large-scale solar tracker installations, with several hundred up to several thousands of solar tracker assemblies, a mesh local area network has several disadvantages. The adding of additional NCUs to the network requires that AC power be routed to each of the NCUs. As a large solar tracker installation may have the solar tracker assemblies spread out over a large geographic site or location, determining how many NCUs are required, where each of the NCUs must be located, and routing AC power to each NCU location is a time consuming and expensive task. Further, the larger the number of NCUs utilized in a large-scale solar tracker installation, the lower the reliability of the communications and control network and the greater the cost of operating and maintaining the network.

A large-scale solar tracker installation may also include a plurality of weather sensors positioned at various locations about the installation site. The weather sensors may include wind sensors, sunlight sensors, snow sensors, among others. A large amount of data is required to monitor, operate and control the plurality of solar tracker assemblies of a large-scale solar tracker installation. Data and control signals must move in two directions, that is, in the "down" direction from the NCU to the solar tracker controller and in the "up" direction from the solar tracker controller or from the plurality of weather sensors to the NCU. The data moving in the "up" direction from the solar tracker controllers would include operating data generated by each of the plurality of solar tracker controllers relating to the controller's corresponding solar tracker assembly regarding performance of the solar tracker assembly and any required maintenance required by the solar tracker assembly. Data moving in the "up" direction would also include weather condition data relating generated by the plurality of weather sensors.

What is needed is a solar tracker control system for a large-scale solar tracker installation that provides for efficient wireless control and communications of data and control signals in both the "up" and "down directions, including solar tracker assembly operating data, weather condition data, and control signal transmission between a central controller, a plurality of solar tracker controllers associated with a plurality of solar tracker assemblies, and a plurality of weather sensors. What is also needed is a solar tracker control system that allows for wireless communications of operating data and weather condition data to a cloud storage database so that the data may be locally or remotely accessed for monitoring performance and/or determining maintenance needs of the solar tracker assemblies. What is also needed is a solar tracker control and communications system that utilizes wireless communications to minimizes the number of AC power lines needed to be run for operation and control of the solar tracker installation including: a) the central controller the plurality of solar tracker controllers; c) the plurality of weather sensors; and d) the drive mechanisms of the plurality of solar tracker assemblies.

SUMMARY

In one aspect, the present disclosure relates to a solar tracker control system for a solar tracker installation located on an installation site, the solar tracker installation including a plurality of solar tracker assemblies, each of the plurality of solar tracker assemblies including a table supporting a plurality of photovoltaic modules, the table being rotatable through an angle of inclination range and a drive mechanism coupled to the table for changing a table angle of inclination, the solar tracker control system comprising: a) a plurality of solar tracker controllers, each solar tracker controller of the plurality of solar tracker controllers associated with a respective different one of the plurality of solar tracker assemblies, each solar tracker controller of the plurality of solar tracker controllers including an actuator for changing the table angle of inclination of the associated solar tracker assembly by actuating the drive mechanism of the associated solar tracker assembly; b) one or more weather sensors periodically wirelessly transmitting weather condition data to each solar tracker controller of the plurality of solar tracker controllers; c) an array controller in wireless communications with each solar tracker controller of the plurality of solar tracker controllers; d) each solar tracker controller of the plurality of solar tracker controllers wirelessly communicating table angle of inclination data of the associated solar tracker assembly to the array controller; and e) each solar tracker controller of the plurality of solar tracker controllers analyzing the weather condition data and, if an out-of-range weather condition is determined for the associated solar tracker assembly, the solar tracker controller changing the table angle of inclination of the associated solar tracker assembly.

In another aspect, the present disclosure relates to a solar tracker control system for a solar tracker installation located on an installation site, the solar tracker installation including a plurality of solar tracker assemblies, each of the plurality of solar tracker assemblies including a table supporting a plurality of photovoltaic modules, the table being rotatable through an angle of inclination range and a drive mechanism coupled to the table for changing a table angle of inclination, the solar tracker control system comprising: a) a plurality of solar tracker controllers, each solar tracker controller of the plurality of solar tracker controllers associated with a respective different one of the plurality of solar tracker assemblies, each solar tracker controller of the plurality of solar tracker controllers including an actuator for changing the table angle of inclination of the associated solar tracker assembly by actuating the drive mechanism of the associated solar tracker assembly, each solar tracker controller of the plurality of solar tracker controllers periodically transmitting tracker operating data for the associated solar tracker assembly; b) one or more weather sensors periodically transmitting weather condition data to each solar tracker controller of the plurality of solar tracker controllers; c) an array controller in wireless communications with each solar tracker controller of the plurality of solar tracker controllers; d) each solar tracker controller of the plurality of solar tracker controllers wirelessly communicating tracker operating data of the associated solar tracker assembly to the array controller; and e) each solar tracker controller of the plurality of solar tracker controllers analyzing the weather condition data and, if an out-of-range weather condition is determined for the associated solar tracker assembly, the solar tracker controller changing the table angle of inclination of the associated solar tracker assembly.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

DETAILED DESCRIPTION

Figure 1:
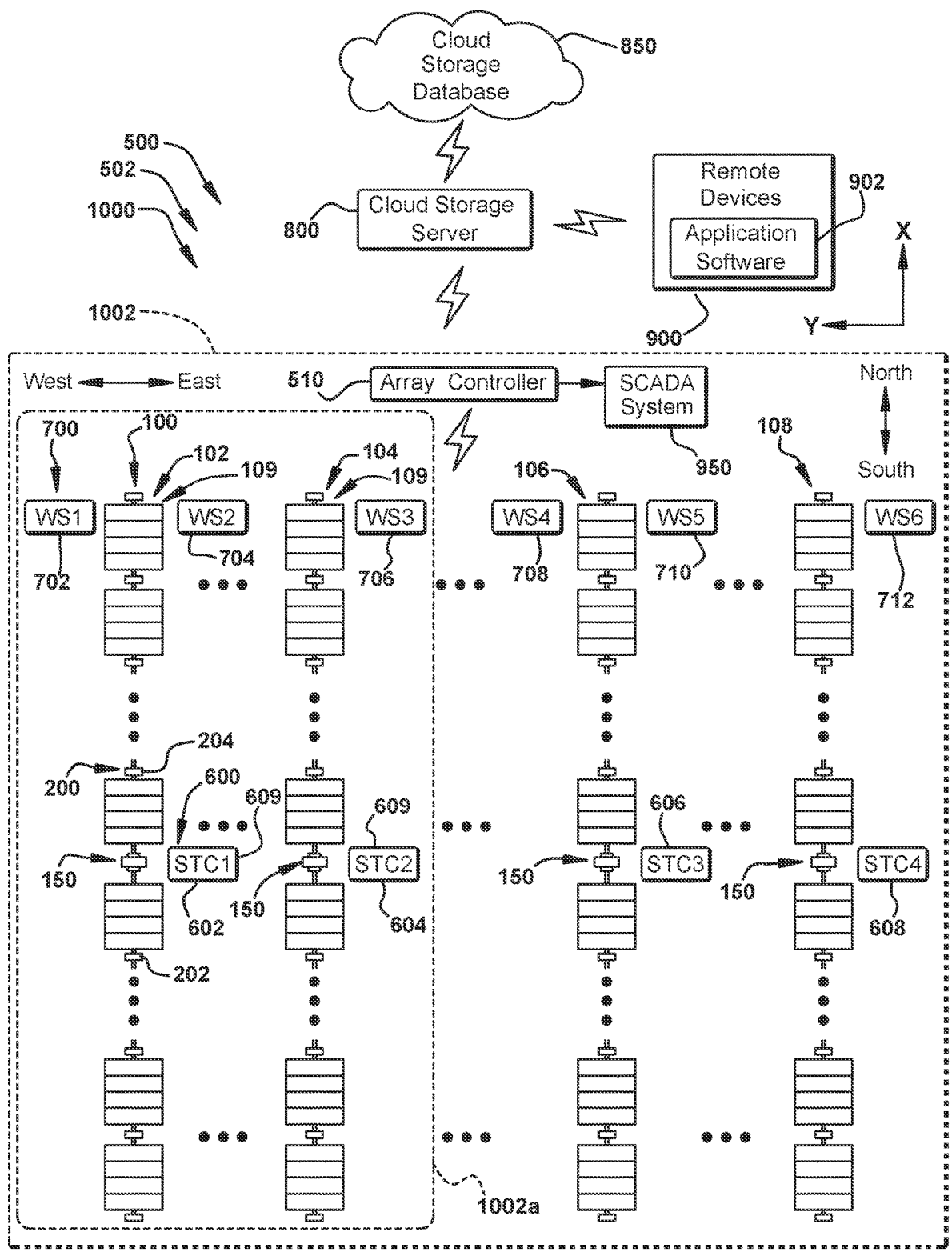
FIG. 1 is a simplified, diagrammatic view of a solar tracker installation of the present disclosure including a plurality of horizontal, single axis solar tracker assemblies and a plurality of weather sensors located on an installation site, each of the solar tracker assemblies operating under the control of an associated solar tracker controller, and a first example embodiment of a wireless control and communications system of the present disclosure for data communications, data storage, and operational control of the respective controllers of the plurality of solar tracker assemblies of the solar tracker installation by an array controller/central controller, the array controller utilizing a cloud storage server and remote cloud storage database for uploading solar tracker operating data wirelessly transmitted to the array controller by the plurality of solar tracker controllers regarding the plurality of solar tracker assemblies thereby facilitating wireless access to operating data and required maintenance of the plurality of solar tracker assemblies by remote devices/users from the cloud storage database via the cloud storage server and for uploading weather condition data wirelessly transmitted to the array controller by the plurality of weather sensors.

The present disclosure relates to a large-scale solar tracker installation, sometimes referred to as a utility-scale installation, schematically depicted at 1000 in FIG. 1, located on installation site which may include one or more plots of land in geographic proximity. A large-scale solar tracker installation 1000 may have several hundred to several thousands of solar tracker assemblies installed on the installation site 1002, which may occupy 100 acres or more of land. The set or array of solar tracker assemblies of the installation 1000 will be referred to herein as a plurality of solar tracker assemblies 100 of the solar tracker installation 1000. The installation site of the solar tracker installation 1000 is schematically depicted as a geographic area within the bounds of a dashed line labeled 1002 in FIG. 1, however, it should be understood that the site 1002 could include two or more geographic areas or plots of land that are non-contiguous. Advantageously, the solar tracker installation 1000 includes a solar tracker control and communications system 500 (hereinafter also alternately referred to as "solar tracker control system" or "control system") of the present disclosure that employs a long-range, radio frequency, sub GHz, wireless data communications protocol and a star wireless communications network configuration 502 (best illustrated in FIG. 8) to allow for centralized control of the installation 1000 by a central controller or array controller 510 (as used herein, the terms "central controller" and "array controller" are understood to be synonymous) and provide for efficient, wireless transmission of data and control signals between the array controller 510, a plurality of solar tracker controllers 600, and a plurality of weather sensors 700. In one exemplary embodiment, each of the solar tracker controllers, for example, representative solar tracker controller 602 of the plurality of solar tracker controllers 600 is associated with a different respective one, for example, representative solar tracker assembly 102 of the plurality of solar tracker assemblies 100. Each solar tracker assembly of the plurality of solar tracker assemblies 100 includes a table 110 which supports a plurality of photovoltaic modules 190. The table 110 of a solar tracker assembly, for example, the representative solar tracker assembly 102, is pivoted through an angle of inclination range AIR by a drive mechanism or drive assembly 150 of the solar tracker assembly 102 so that the plurality of photovoltaic modules 190 track a position of the sun as the sun moves across the sky from east to west. The solar tracker controller 602 controls an angle of inclination AI of the table 110 of its associated the solar tracker assembly 102 by actuating the drive mechanism 150 of the solar tracker assembly 102.

Advantageously, in the local area communications network configuration 502 of the solar tracker control system 500 of the present disclosure, the central controller/array controller 510 directly and wirelessly communicates with: a) each of solar tracker controllers of the plurality of solar tracker controllers 600; and b) each of the weather sensors of the plurality of weather sensors 700 thereby mitigating the inefficiencies of a mesh local area network communication configuration utilizing multiple NCUs. In one example embodiment, the local area communications network configuration 502 of the solar tracker control system 500 of the present disclosure advantageously utilizes a LoRa (long rang), sub-GHz (sub-gigahertz), radio frequency (RF) modulated, communications network with the array controller 510 including a LoRa wireless communications gateway 512 and each of the plurality solar tracker controllers 600 and each of the plurality of weather sensors 700 including a LoRa wireless communications device 627, 740, respectively, to enable direct, wireless communications between the array controller 510 and each of the plurality of solar tracker controllers 600 and between the array controller 510 and each of the plurality of weather sensors 700. The effective communication range of such the star configuration, LoRa RF wireless communications network 502 is on the order of one mile. Accordingly, the single array controller 510, properly or centrally positioned on, for example, a 100 acre installation site 1002, can directly and wirelessly receive communications from and send communications to each of the plurality of solar tracker controllers 600, which may include hundreds or thousands of solar tracker controllers and associated solar tracker assemblies in a large-scale solar tracker installation 1000, which are located throughout or over the geographic extent of, for example, a 100 acre installation site 1002. The single array controller 510 can also directly and wirelessly communicate with the plurality of weather sensors 700, which are distributed over the geographic extent of the 100 acre installation site. Typically, the number of weather sensors in the plurality of weather sensors 700 is much smaller than the number of solar tracker assemblies in the plurality of solar tracker assemblies 100 for a given large-scale solar tracker installation 1000.

The solar tracker control system 500 of the present disclosure utilizes, in one exemplary embodiment, includes a single array controller 510, with the array controller 510 being the center or apex of the star wireless communications network configuration 502 utilizing a sub-GHz, RF wireless communications network and a LoRa communications protocol, with the plurality of solar tracker controllers 600 and the plurality of weather sensors 700 being the end nodes of the network configuration. Compared to prior mesh communication networks with multiple NCUs distributed over the extent of an installation site, the long-range, point-to-point, direct wireless communications network 502 of the present disclosure advantageously reduces the installation costs associated with running AC power lines to each NCUs distributed throughout the installation site. Instead, in one exemplary embodiment of the solar tracker control system 500, AC power is routed to the single array controller 510, as opposed to multiple, geographically spaced apart NCUs.

The array controller 510, in one exemplary embodiment, also wirelessly communicates with a cloud storage server 800, which accesses and stores data regarding the solar tracker installation 1000 in a cloud storage database 850. In one exemplary embodiment of the solar tracker control system 500, communications between the array controller 510 and the cloud storage database 850 is performed wirelessly utilizing an internet connection to the cloud storage server, which may be through a router 524 (which is part of electronics 510a of the array controller 510) or via a cellular network. Additionally and advantageously, in one exemplary embodiment of the solar tracker control and communications system 500 of the present disclosure, each of solar tracker controllers of the plurality of solar tracker controllers 600 is powered by a dedicated photovoltaic module 647 which is mounted to a torque tube beam 250 of the controller's associated solar tracker assembly of the plurality of solar tracker assemblies 100 and is aligned with the plurality of photovoltaic modules 190 of the table 100 of its associated the solar tracker assembly of the plurality of solar tracker assemblies 100. For example, representative solar tracker controller 602 receives the power from the dedicated photovoltaic module 647, stores the power in a DC battery 645, and uses the stored power to actuate, as required, an actuator 630a which, in turn, drives the drive mechanism 150 of the associated solar tracker assembly 102 to move or pivot the table 110 of the solar tracker assembly 102, as desired, through its angle of inclination range AIR. In one exemplary embodiment of the solar tracker controller 602, the actuator 630a of the solar tracker controller 602 is a DC motor driver 630 which drives a DC drive motor 180 of the drive mechanism 150 of the associated solar tracker assembly 102. Unlike the larger photovoltaic modules of the plurality of photovoltaic modules 190, the dedicated photovoltaic module 647 may be of smaller size and power output since it only has to generate enough DC power to power electronics of the solar tracker controller 602. Such a smaller, dedicated photovoltaic module 647 is sometimes referred to a "pony panel" and has a DC power output in the range of 30 watts.

Providing a power to each of the plurality of controllers 600, for example, solar tracker controller 602, via a dedicated photovoltaic module 647 mounted to the torque tube beam 250 and pivoting with the table 110 of its associated solar tracker assembly 102, advantageously also reduces the need for installing AC power lines to each of the plurality of solar tracker controller 600. Each solar tracker assembly 102 of the plurality of solar tracker assemblies 100 includes the dedicated, corresponding solar tracker controller 602 of the plurality of solar tracker controllers 600 in proximity to and, in one exemplary embodiment, mounted to the torque tube 250 of its associated solar tracker assembly 102. Given the large geographic size of the installation site 1002 and further given that the large-scale solar tracker installation 1000 may include from several hundreds to several thousands of single axis solar tracker assemblies 100, the cost savings resulting from eliminating the need to run AC power lines to each solar tracker controller of the plurality of solar tracker controllers 600 and multiple NCUs is significant, both in terms of installation cost savings and in terms of installation maintenance costs associated with maintaining/trouble shooting AC power lines. Additionally and advantageously, the solar tracker control system 500 of the present disclosure, by providing for wireless communications for data and control signals is also more reliable than prior art installations utilizing data communication cables for data communications between solar tracker assemblies, weather sensors and multiple NCUs (that is, multiple central controllers). Improved reliability of data and control signal transmission afforded by the solar tracker control system 500 of the present disclosure means less downtime and increases the overall operating efficiency of the installation 1000.

Solar Tracker Installation 1000

In one exemplary embodiment, the solar tracker installation 1000 includes the plurality of single axis, solar tracker assemblies 100 and the plurality of weather sensors 700 distributed about the installation site 1002, each of the plurality of solar tracker assemblies 100 being generally in a north-south orientation, as schematically depicted in FIGS. 1-4. In the schematic depiction of FIG. 1, four representative single axis, solar tracker assemblies 102, 104, 106, 108 are depicted along with six representative weather sensors 702, 704, 706, 708, 710, 712. Although only four single axis, solar tracker assemblies are diagrammatically depicted in FIG. 1, it should be understood that the large-scale solar tracker installation 1000 will include, as noted above, from several hundreds to several thousands of single axis solar tracker assemblies 100 located on the site 1002. The plurality of weather sensors 700 will typically include pyranometers (sunlight sensors), anemometers (wind speed sensors), and snow sensors for detection of snow accumulation on the upper surfaces of a plurality of photovoltaic modules 190 of a solar tracker assembly. Again, it should be understood that the number of weather sensors in the plurality of weather sensors 700 may exceed the six weather sensors diagrammatically depicted in FIG. 1 and may include sensors other than those enumerated above, depending on the geographic size of the site 1002, the number of solar tracker assembly, design considerations of the installation 1000. As noted above, in a large-scale solar tracker installation 1000, the number of weather sensors in the plurality of weather sensors 700 is typically much, much smaller than the number of solar tracker assemblies in the plurality of solar tracker assemblies 100.

In one exemplary embodiment, each of the plurality of weather sensors 700, for example, representative weather sensor 702 of the plurality of weather sensors 700, includes an external sensor 750, such as a pyranometer, anemometer, snow sensor, etc., for sensing a weather condition and weather sensor electronics 735 disposed in a housing 745. The weather sensor electronics includes a microprocessor or microcontroller 737 and a LoRa wireless communications device 740. In one exemplary embodiment, the LoRa wireless communications device 740 comprises a LoRa communications bridge or transceiver 740a built onto a printed circuit board (pcb) and an antenna for the transceiver 740a, also fabricated into the printed circuit board. In one exemplary embodiment, the plurality of weather sensors 700 are powered by AC power lines. The weather sensor electronics includes an AC/DC converter to convert the supplied AC power into DC power to power the weather sensor electronics. Utilizing the LoRa wireless communications devices, weather sensor 702 periodically transmits weather condition data 720 and weather sensor identification data 715 (uniquely identifying the weather sensor 702) to the array controller 510. The communication of weather condition data 720 and weather sensor identification data 715 from the weather sensor 702 to the array controller 510 in the solar tracker control and communications system 500 of the present disclosure is advantageously direct or point-to-point, RF wireless communications utilizing RF, subGHz, LoRa communication devices utilizing a LoRaWAN communications protocol which allow direct, point-to-point wireless communications between nodes (plurality of weather sensors 700, plurality of tracker controllers 600 and the array controller 510) in the network 502 at a distance of 1 mile (or more). The communications between the weather sensor 702 and the array controller 510 can be both in the "up" direction, that is, from the weather sensor 702 to the array controller 510 and the "down" direction, that is, from the array controller 510 to the weather sensor 702. For example, if the weather sensor 702 is transmitting weather condition data 720 that is clearly false or inconsistent, the array controller 510 will transmit control signals to the weather sensor to shut down the weather sensor 702 until appropriate maintenance action can be taken with regard to the weather sensor 702.

In an alternate exemplary embodiment, one or more of the plurality of weather sensors 700 may be powered by DC power, as opposed to running AC power lines to each of the plurality of weather sensors 702. In one exemplary embodiment, each weather sensor would have a dedicated photovoltaic module which would provide DC power charge a DC battery. The DC battery, in turn, would power the weather sensor electronics. The dedicated photovoltaic module may be of a smaller size than the photovoltaic modules since the amount of power needed to change the DC battery and maintain proper change for powering weather sensor electronics is relatively small.

Similarly, each of the plurality of tracker controllers 600, for example, representative tracker controller 602 of the plurality of solar tracker controllers 600, controls, among other things, the angle of inclination AI of the table 100 of its associated solar tracker controller 102. The solar tracker controller 702 includes electronics 620 disposed within a controller housing 610. The controller electronics 620 includes, in one exemplary embodiment, a microprocessor or microcontroller 635 which, in one exemplar embodiment, is surface-mounted on a printed circuit board (pcb) 625 disposed in the controller housing 610. Integrated into the microcontroller 635 is a LoRa wireless communications device or transceiver 627 and an associated antenna fabricated on the printed circuit board 625. The controller electronics 620 further includes a DC battery 645 which stores power generated by the dedicated photovoltaic module 647 and the actuator 630a for actuating the drive mechanism 150 of the solar tracker assembly 102 to pivot, as required, the angle of inclination AI of the table 100 of the solar tracker assembly 102 such that the upper surfaces of the plurality of photovoltaic modules 190 and an upper surface of the dedicated photovoltaic module 647 track the sun as it moves across the sky. The battery 645 utilizes the stored power to power the controller electronics 620.

In one exemplary embodiment, the actuator 630a comprises the DC motor driver 630 which is coupled to a DC drive motor 180 of the drive mechanism 150 of the solar tracker assembly 102. The DC motor driver 630 of the solar tracker controller 602 precisely actuates or drives the DC drive motor 180 of the drive mechanism 150 to precisely rotate or pivot the table angle of inclination AI of the solar tracker assembly 102. Utilizing the LoRa wireless communications device or transceiver 627, the tracker controller 602 periodically transmits tracker operating 660 and tracker controller identification data or tracker identification data 650 to the array controller 510. The tracker identification data 650 uniquely identifies either or both of the tracker controller 602 and the associated solar tracker assembly 102. The tracker operating data 660 includes data regarding the operational status of both the tracker controller 102 (e.g., status of the controller DC battery 645) and operating data relating to the solar tracker assembly 102 (e.g., power output of the solar tracker assembly 102). Included in the tracker operating data 660 is data 670 relating to the current angle of inclination AI of the table 110 of the solar tracker assembly 102. The communication of tracker operating data 660 and tracker identification data 650 from the solar tracker controller 602 to the array controller 510 in the solar tracker control and communications system 500 of the present disclosure is advantageously direct or point-to-point, RF wireless communications utilizing a LoRa communication devices utilizing a LoRaWAN (LoRa) communications protocol which allows direct, point-to-point wireless communications between nodes of the network 502, i.e., the plurality of weather sensors 700, the plurality of tracker controllers 600 and the array controller 510, at a distance of 1 mile (or more). The communications between the solar tracker controller 602 and the array controller 510 is in both in the "up" direction, that is, from the solar tracker controller 602 to the array controller 510 and the "down" direction, that is, from the array controller 510 to the solar tracker controller 602. For example, if the solar tracker controller 602 is transmitting operating data 660 that indicates that the controller electronics 620 are not operating properly or the power output of the plurality of photovoltaic panels 190 is unacceptably low or the tracker table angle of inclination data 670 indicates that the table 110 is not properly tracking the position of the sun, the array controller 510 will transmit operating data related control signals 555 to the solar tracker controller 102 to move or pivot the table 110 to one or more predetermined positions, such as one or more maintenance positions. As used herein, an improper operating condition or a need for maintenance for either the solar tracker controller 602 or the associated solar tracker assembly 102 will be referred to as an out-of-range operating condition 1150. Additionally, the array controller 510 may transmit control signals to other solar tracker controllers in the vicinity of the solar tracker controller 102 to move or pivot their respective tables to one or more predetermined positions to avoid potential shading problems, that is, the angle of inclination AI of one table 110 being at a value that, given the current position of the sun, causes the table to cast a shadow on the plurality of photovoltaic modules of another solar tracker assembly adjacent to or in the vicinity of the solar tracker assembly 102. Similarly, the array controller 510 may transmit weather related control signals 550 to a group of solar tracker controllers that are within a region of the installation site 1002 that is subject to a detrimental or potentially detrimental weather condition, e.g., a high wind condition or a complete overcast condition, to move or pivot the tables 110 of the associated solar tracker assemblies to one or more predetermined wind stow positions or one or more predetermined overcast positions until the detrimental weather condition has passed. As used herein, a detrimental weather condition is one that may result in damage to one or more components of one or more solar tracker assemblies of the plurality of solar tracker assemblies 100 or result in reduced power output from one or more of the solar tracker assemblies of the plurality of solar tracker assemblies 100 and will be referred to as an out-of-range weather condition 1100.

As one of skill in the art would recognize, the functionality and advantages of the wireless communications of the solar tracker control system 500 of the present disclosure would also be applicable to other solar tracker configurations, e.g., a large-scale solar tracker installation that includes a plurality of two axis, solar tracker assemblies in addition to or in place of the plurality of single axis, solar tracker assemblies 100. Additionally, the cost savings resulting from a reduction in AC power lines afforded by: a) the wireless communications of the solar tracker control system 500 of the present disclosure; and b) providing dedicated photovoltaic modules 647 to power each of the plurality of solar tracker controllers 600, and, in turn, actuate the drive mechanism 150 of the associated solar tracker assembly 102 to move or pivot the table 110 of the associated solar tracker assembly 102, as desired, through its angle of inclination range AIR, would also be advantageous for smaller scale solar tracker installations (e.g., a solar tracker installation with 100 solar tracker assemblies), albeit to a reduced degree. That is, reduction in running AC power lines to components and enhanced reliability afforded by wireless communications and the use of dedicated photovoltaic modules 647 to power the plurality of solar tracker controllers 600 would always be advantageous, regardless of the size of the installation or the geographic extent of the installation site. Thus, the scope of the present disclosure is not limited to large-scale, single axis solar tracker assembly installations.

Figure 2:
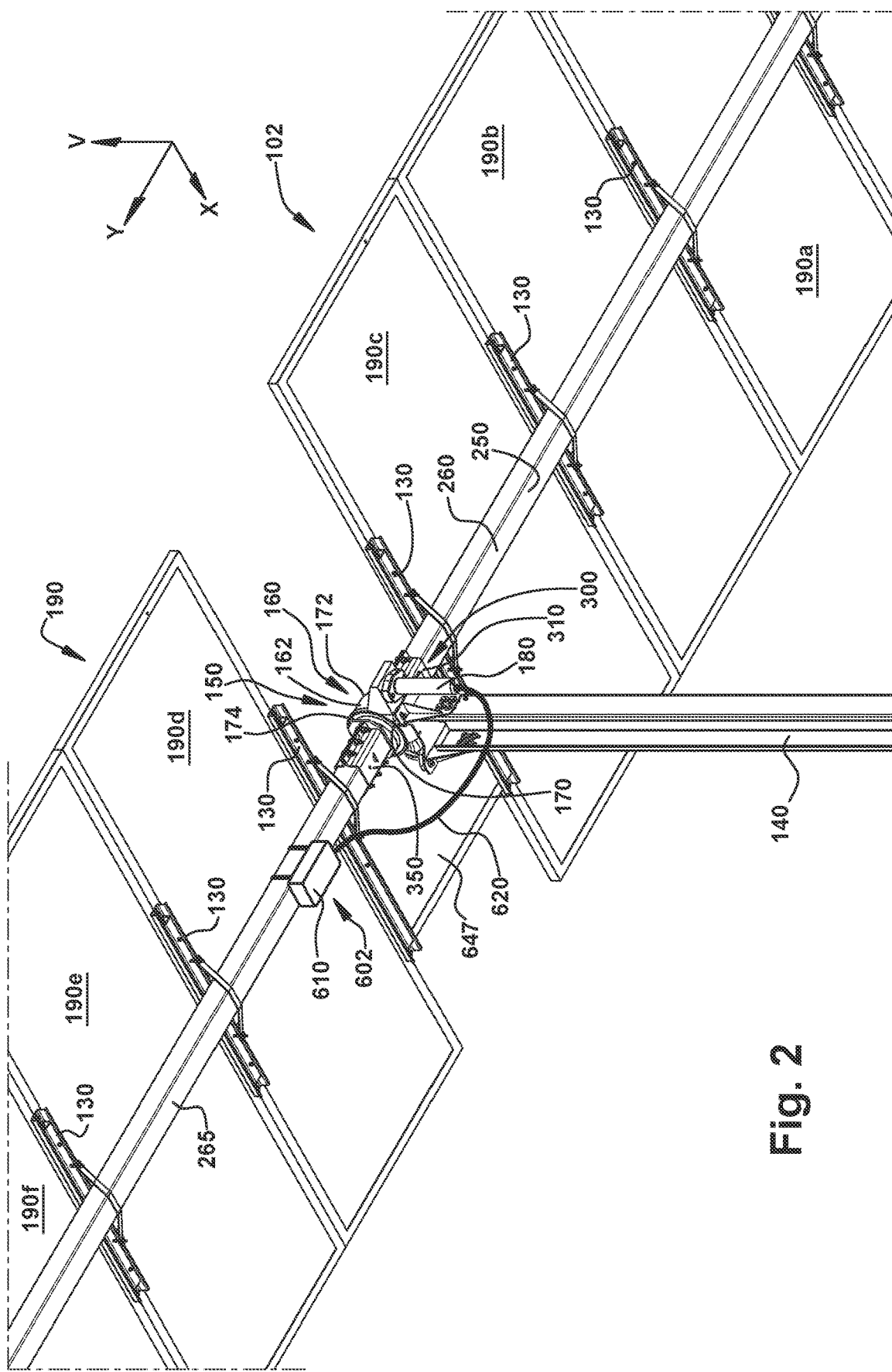
FIG. 2 is a schematic bottom perspective view of a portion of a representative solar tracker assembly of the plurality of solar tracker assemblies of the solar tracker installation of FIG. 1, including a solar tracker controller associated with the solar tracker assembly operatively coupled to a drive mechanism of the solar tracker assembly, the solar tracker controller operating via the drive mechanism to change an angle of inclination of the solar tracker, the solar tracker controller including a dedicated photovoltaic module for providing power to the solar tracker controller.

Each solar tracker assembly, e.g., representative solar tracker assemblies 102, 104, 106, 108, of the plurality of solar tracker assemblies 100 operates under the control of an associated, dedicated solar tracker controller of the plurality of solar tracker controllers 600. In one exemplary embodiment, the housing 610 containing electronics of a solar tracker controller, is mounted to a torque tube beam 250 of its associated solar tracker assembly, as schematically depicted in FIG. 2. For example, a solar tracker controller 602 of the plurality of solar tracker controllers 600 is associated with and, via the actuator 630a of the solar tracker controller 602 which is operatively coupled to the drive mechanism 150 of the solar tracker assembly 102, controls the angle of inclination of a table 110 of the solar tracker assembly 102. Similarly, a solar tracker controller 604 of the plurality of solar tracker controllers 600 is associated with and, via the actuator 630a of the solar tracker controller 604 which is operatively coupled to the drive mechanism 150 of the solar tracker assembly 104, controls an angle of inclination AI of a table 110 of the solar tracker assembly 104 and so forth. Each of the solar tracker controllers of the plurality of solar tracker controllers 600 may be considered to be part of its associated solar tracker assembly of the plurality of solar tracker assemblies 100. For example, the solar tracker assembly 602 may be considered as a component of its associated solar tracker assembly 102. Additionally, each of the solar tracker controllers of the plurality of solar tracker controllers 600, for example, representative solar tracker controller 602, is also part of the solar tracker control and communications system 500.

Figure 5:
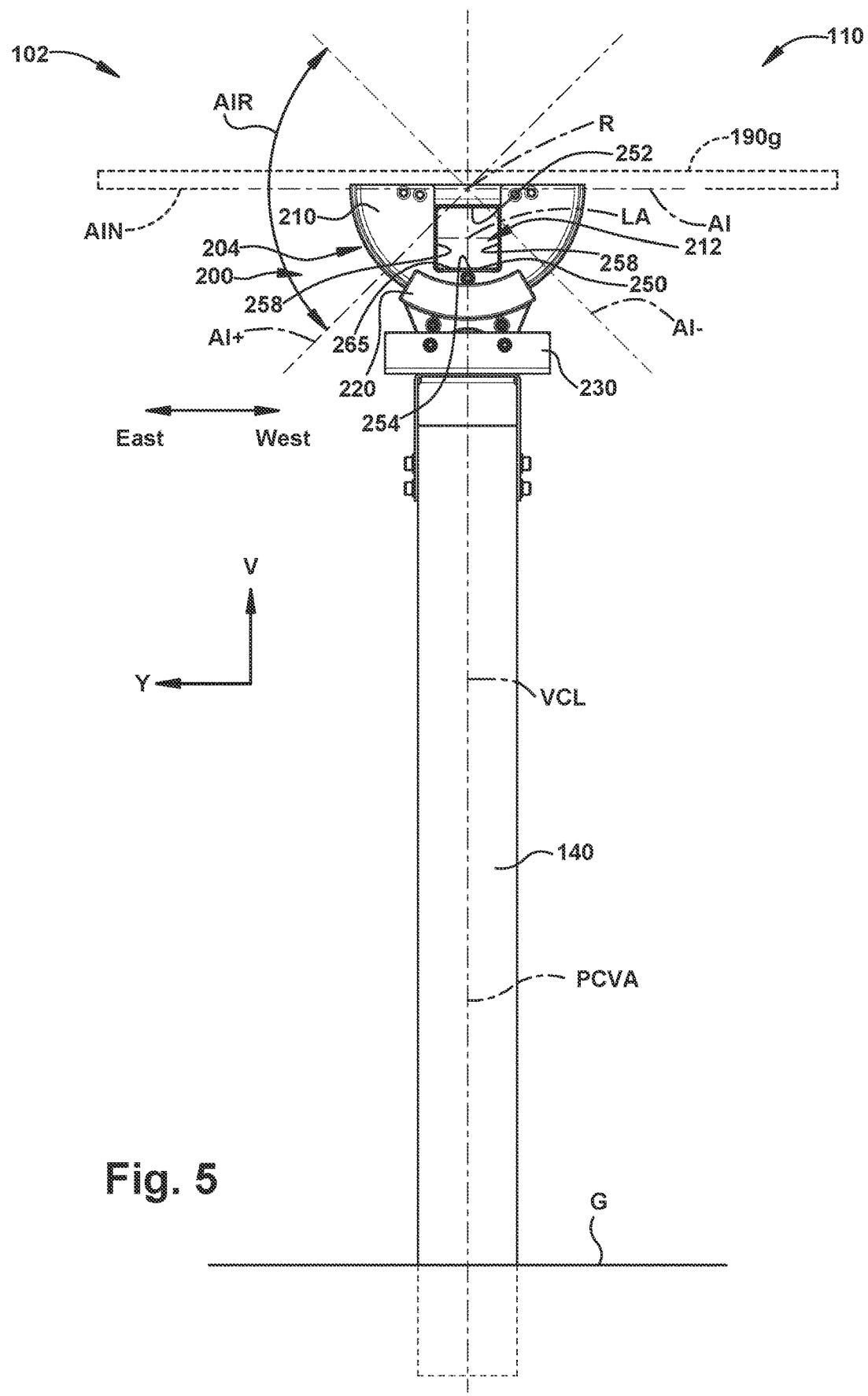
FIG. 5 is a schematic vertical section view of the representative solar tracker assembly of FIG. 2, as seen from a plane indicated by the line 5-5 in FIG. 4.

In FIG. 5, the angle of inclination range AIR of the table 110 of the solar tracker assembly 102 is schematically depicted, along with maximum positive and negative table angles of inclination AI+, AI−. In FIG. 5, a representative photovoltaic module 190g of the solar tracker assembly 102 is shown in dashed line with a neutral angle of inclination AIN, which means the photovoltaic module 190g (and therefore, the table 110 of the solar tracker assembly 102) is horizontal, facing directly upward, for example, when the sun is at its apex in the sky. A solar tracker controller 606 of the plurality of solar tracker controllers 600 is associated with and, via the drive mechanism 150 of the solar tracker assembly 106, controls the angle of inclination of a table 110 of the solar tracker assembly 106.

Solar Tracker Assembly 102 and Tracker Controller 602

A representative solar tracker assembly of the plurality of solar tracker assemblies 100 will be briefly described with the understanding that, in one exemplary embodiment, each solar tracker assembly of the plurality of solar tracker assemblies 100 of the solar tracker installation 1000 is similar in function and configuration. Similarly, a representative solar tracker controller of the plurality of solar tracker controllers 600 will be briefly described with the understanding that, in one exemplary embodiment, each of the plurality of solar tracker controllers 600 is similar in function and configuration. As used herein, when referring to a specific solar tracker assembly of the plurality of solar tracker assemblies 100, for simplicity, reference will be made to the representative solar tracker assembly 102 and when referring to specific solar tracker controller of the plurality of solar tracker controllers 600, for simplicity, reference will be made to the solar tracker controller 602. While the solar tracker controller 602 is part of the solar tracker control system 500, it is also part of its associated solar tracker assembly 102. As noted above, in one exemplary embodiment, the housing 610 of the solar tracker controller 602, enclosing electronics of the controller, is mounted to a lower wall 254 of the torque tube beam 250 of the solar tracker assembly 102 and the solar tracker controller 602 is powered by the dedicated photovoltaic module 647, which is also mounted to the torque tube beam 250. The dedicated photovoltaic module 647 is mounted to the torque tube beam 250 such that it is aligned with the plurality of photovoltaic modules 190 and pivots with the plurality of photovoltaic modules 190 through the table angle of inclination AI.

In one exemplary embodiment, the solar tracker assembly 102 is a single row, horizontal, single axis solar tracker assembly wherein the table 110 of the solar tracker assembly 102 is rotated or pivoted by the drive mechanism 150 through the angle of inclination range AIR (schematically depicted in FIG. 5) to track movement of the sun across the sky/horizon. The drive mechanism 150 of the solar tracker assembly 102 is controlled by the solar tracker controller 602, which is part of the solar tracker control system 500. In one exemplary embodiment, the drive mechanism 150 of the representative solar tracker assembly 102 comprises a single drive motor 180 operatively coupled to a single slew drive or slew gear drive 160, which pivots the table 110 through the predetermined angle of inclination range AIR. However, one of skill in the art would appreciate that the concepts of the present disclosure are equally applicable to solar tracker systems where multiple slew drives are utilized along an extent of the table to pivot the table 110. In one exemplary embodiment, the drive motor 180 is a DC motor and, more specifically, a DC drive motor. However, it should be recognized that the drive motor 180 may alternatively an AC drive motor. Utilizing an AC drive motor, however, will require routing of AC power lines to the AC drive motors of each of the plurality of solar tracker assemblies 100. However, use of an AC drive motor, is within the scope of the present disclosure. If an AC drive motor is utilized, the actuator 630a of the associated solar tracker controller 602 will be an AC motor driver, as opposed to the DC motor driver 630.

The table 110 includes all rotating or pivoting components of the solar tracker assembly 100 including: a) a plurality of photovoltaic modules 190, b) a frame 120 including a plurality of mounting brackets 130 which support the plurality of photovoltaic modules 190 and couple the plurality of photovoltaic modules 190 to the torque tube beam 250, c) the torque tube beam 250, extending generally in a north-south direction and extending horizontally, that is, generally parallel to a substrate or ground G, supports the frame 120 and, in turn, is driven through the angle of inclination range AIR by a rotating drive or rotatable drive member 170 of the slew drive 160 of the drive mechanism 150; d) rotatable bearing assemblies 210 of each of a plurality of bearing apparatuses 200 positioned at spaced apart intervals along the torque tube beam 250 which rotatably support the torque tube beam 250 (and thereby pivot the frame 120 and plurality of photovoltaic modules 190) and define an axis of rotation R of the table 110; and e) the rotating drive 170 of the slew drive 160 of the drive mechanism 150.

Figure 3:
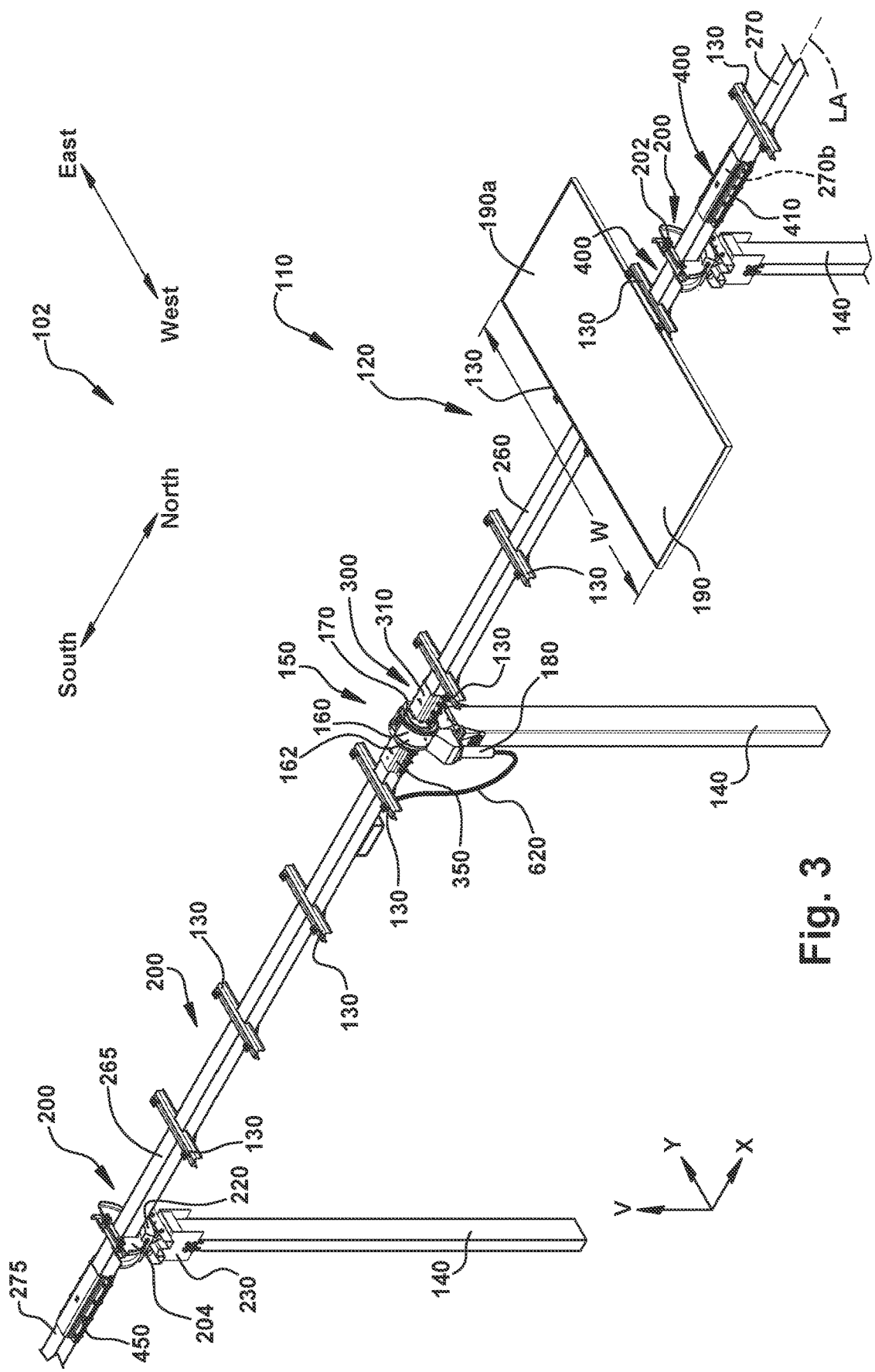
FIG. 3 is a schematic top perspective view of a portion of the representative solar tracker assembly of FIG. 2.
Figure 4:
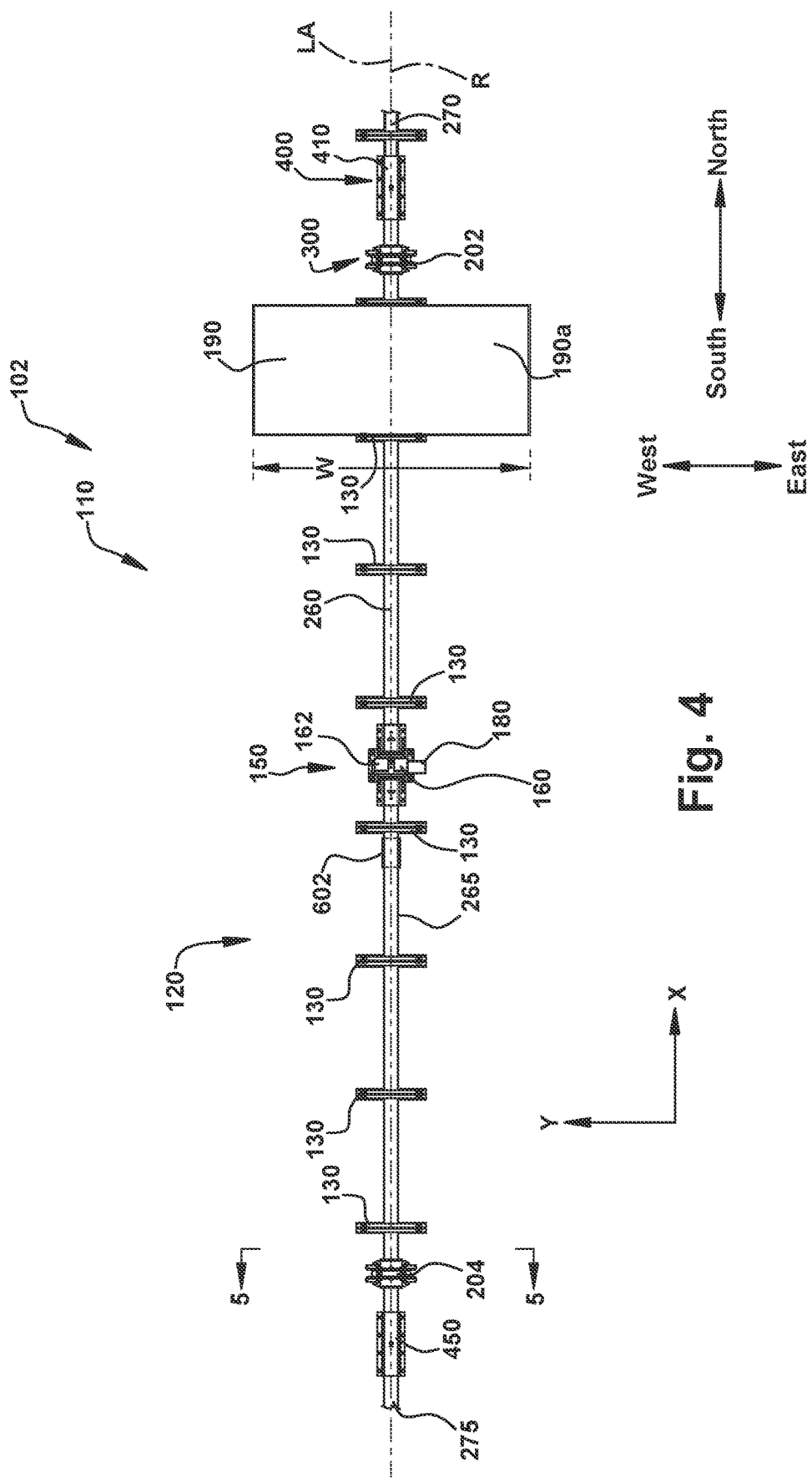
FIG. 4 is a schematic top plan view of the representative solar tracker assembly of FIG. 2.

As best seen in FIGS. 2-5, the representative solar tracker assembly 102 includes the drive mechanism 150 to rotate a table 110 of the solar tracker assembly 100 about a table axis of rotation R through the predetermined angle of inclination range AIR. The table 110 of the solar tracker assembly 102 includes the frame 120 supporting a plurality of photovoltaic modules 190, including, as schematically depicted in FIG. 2, representative photovoltaic modules 190a, 190b, 190c, 190d, 190e, 190f. The rotatable torque tube beam 250 of the table 110, in turn, supports the frame 120. The plurality of bearing apparatuses 200, including representative bearing apparatuses 202, 204, in turn, rotatably support the torque tube beam 250. The torque tube beam 250 is comprised of a plurality of aligned and couple torque tube beam segments. In FIGS. 3 and 4, portions of four torque tube beam segments, namely, first, second, third and fourth torque tube beam segments 260, 265, 270, 275 of the torque tube beam 250 are schematically depicted, it being understood that the solar tracker assembly 100 includes additional torque tube beam segments not shown. The plurality of bearing apparatuses 200 are advantageously configured and positioned such that, other than the first and second torque tube beam segments 260, 265 of the torque tube beam 250 adjacent the drive mechanism 150, the table axis of rotation R, is vertically aligned with, that is, would pass through or be acceptably close, for design purposes, to passing through a center of gravity or center of mass of the table 110.

In one exemplary embodiment, the torque tube beam 250 comprises a hollow metal tube that is substantially square in cross section, having an open interior that is centered about a central longitudinal axis LA. In one exemplary embodiment, the torque tube beam 250 is approximately 100 mm. by 100 mm. (approximately 4 in. by 4 in.) and includes an upper wall 252 and the lower wall 254 spaced apart by parallel side walls 258. The torque tube beam 250 extends along the longitudinal axis LA of the torque tube beam 250 and, as noted above, extends generally parallel to the ground G (FIG. 5). Hence, as the ground is generally horizontal, the solar tracker assembly is referred to as a horizontal, single axis solar tracker assembly 100. The torque tube beam 250 is comprised of a number of connected torque tube beam segments, each of which is approximately 40 feet in length. In the schematic depiction of FIGS. 2-5, only a portion of the solar tracker assembly 100 and, thus, only a portion of the extent of the torque tube beam 250 and the frame 120 and a portion of the total number of bearing apparatuses of the plurality of bearing apparatuses 200 are shown. For example, in FIGS. 3 and 4, the first and second torque tube beam segments 260, 265 and portions of the third and fourth torque tube beam segments 270, 275 are schematically depicted. Of course, it should be appreciated that given that a torque tube beam segment is typically 40 feet in length and a typical photovoltaic module, such as the representative photovoltaic module 190a is approximately 1 meter by 2 meters and is mounted to the torque tube beam 250 in portrait orientation, many more photovoltaic modules would be present on any given torque tube beam segment than is schematically depicted in the FIGS. 2-4. Given that the plurality of photovoltaic modules 190 are typically supported in so-called one-in-portrait orientation by the plurality of mounting brackets 130, a width W (FIG. 3) of the table 110 is typically 2 meters.

Each bearing apparatus of the plurality of bearing apparatuses 200, for example first and second bearing apparatuses 202, 204, includes the rotatable or rotating bearing assembly 210, the stationary saddle assembly 220 and a connecting assembly 230 (FIGS. 3 and 5). The torque tube beam 250 extends through and is supported by the rotatable bearing assembly 210 which rotates the torque tube beam 250 about the table axis of rotation R. The rotatable bearing assembly 210 of the bearing apparatus 200, in turn, is supported by the stationary saddle assembly 220. The stationary saddle assembly 220 constrains the pivoting or rotation of the rotatable bearing assembly 210 such that the bearing assembly and the torque tube section extending through and supported by the rotatable bearing assembly 210 rotate about a bearing axis of rotation. The table axis of rotation R (except in the region of the slew drive 160) is collectively defined by axes of rotation of the plurality of bearing apparatuses 200 positioned at spaced apart internals along the extent of the torque tube beam 250. Stated another way, each bearing axis of rotation of each bearing apparatus defines a portion of the overall table axis of rotation R. The individual axis of rotation of each of the plurality of solar tracker bearing apparatuses 200 are substantially aligned to or coincident to form a single or combined table axis of rotation R. In the region of the slew drive 160, the table axis of rotation R is defined by: a) the axes of rotation of the first and second bearing apparatus 202, 204 of the plurality of bearing apparatuses 200; and b) the center of rotation of the rotating member 170 of the slew drive 160 and a pair of drive journals 300, which are affixed to opposite sides 172, 174 of the rotating member 170 and, in turn, receive end portions of the first and second torque tube beam segments 260, 265.

The stationary saddle assembly 220 is mounted by the connecting assembly 230 to a support post 140, which is driven into the ground/substrate G or otherwise secured in the ground/substrate G by, for example, concrete. Thus, the support post 140 and connecting assembly 230 determine the position and the vertical height of the rotatable bearing assembly 200. Each of the support posts 140 extend in the vertical direction V along a vertical center line or central vertical axis PCVA (FIG. 5) of the support post 140. For each of the support posts 140, a vertical center line VCL of the bearing assembly 200 is aligned with the center line of the support post 140. The slew drive 160 is similar affixed to a support post 140, which determines the position and vertical height of the rotating drive 170 of the slew drive 160 for purposes of the concentric drive configuration 500. The frame 120, in one exemplary embodiment, includes a plurality of mounting brackets 130 which are spaced along the longitudinal extent of the torque tube beam 250 and each of which is affixed to the torque tube beam 250. Each of the plurality of mounting brackets 130 function to individually secure each photovoltaic module, such as the representative photovoltaic module 190a, of the plurality of photovoltaic modules 190 to the torque tube beam 250. For simplicity, in FIG. 2, portions of six photovoltaic modules, labeled as modules 190a, 190b, 190c, 190d, 190e, 190f are schematically depicted and, in FIGS. 3 and 4, only the single representative photovoltaic module 190a is schematically depicted and is shown in dashed line in FIG. 5. Also not shown in the drawings are a number of clamps and fasteners, which are part of the frame 120 and facilitate securing the plurality of photovoltaic modules 190 to the plurality of mounting brackets 130 and securing the plurality of mounting brackets 130 to the torque tube beam 250. Additional details concerning the configuration of the bearing apparatuses and the frame/mounting brackets may be found in the aforesaid U.S. Pat. No. 10,944,354 to Ballentine et al. and U.S. Pat. No. 11,271,518 to Ballentine et al., both of which are incorporated herein by reference in their respective entireties.

The representative solar tracker assembly 102 includes the drive mechanism 150 which, in one exemplary embodiment, includes the slew drive 160 having the stationary housing 162 supporting the rotating drive member 170. The drive mechanism 150 of the solar tracker assembly 102 operates under the control of the solar tracker controller 602 to pivot or rotate the table 110, including the plurality of photovoltaic modules 190, about the table axis of rotation R. Disposed within the stationary housing 162 is a gear train 164 of the slew drive 160 which is operatively coupled to and drives the rotating drive member 170 about a drive mechanism axis of rotation. The drive mechanism 150 further includes a DC motor 180 coupled to the stationary housing 162 of the slew drive 160. In one exemplary embodiment, the DC motor 180 is a brushed 24 volt DC motor. An output shaft of the DC motor 180 is operatively connected to a gear train of the slew drive 160 such that rotation of the output shaft of the DC motor 180 rotates the slew drive gear train. The slew drive gear train, in turn, is operatively coupled to the rotating drive member 170 of the slew drive 160 such that actuation of the DC motor 180 and rotation of the DC motor output shaft causes a proportional and precise rotation of the rotating drive member 170 of the slew drive 160. This rotation of the slew drive rotating drive member 170, in turn, precisely rotates the table 110 of the solar tracker assembly 102 to a desired table angle of inclination AI. That is, rotation of the rotating drive member 170 of the slew drive 160 by the DC motor 180 causes a precise rotation of the table 110 of the solar tracker assembly 102 to a desired table angle of inclination AI (within, of course, the limits of the table angle of inclination range AIR).

The table 110 pivots or rotates through the angle of inclination range AIR such that the plurality of photovoltaic modules 190 follow a position of the sun as the sun moves from east to west. As best seen in FIG. 3, the table 110 rotates through the predetermined angular inclination range AIR between a maximum positive angle of inclination AI+ wherein the plurality of photovoltaic modules 190 are facing in an easterly direction to receive sunlight at sunrise and a negative angle of inclination AI−, wherein the plurality of photovoltaic modules 190 are facing in a westerly direction to receive sunlight at sunset. At a neutral angle of inclination AIN, the plurality of photovoltaic modules 190 are substantially horizontal, that is, with their upper light receiving surfaces facing directly upward, as would be the case at high noon where the sun is at its apex in the sky.

Advantageously, as previously noted, in one exemplary embodiment, the motor 180 of the drive mechanism 150 is a 24 volt DC brushless motor. The DC motor 180 of the solar tracker assembly 102 does not require AC power, instead, the DC motor 180 is actuated by the actuator 630a of the associated solar tracker controller 602. In one exemplary embodiment, the actuator 630a is the DC motor driver 630 which is operatively coupled to and actuates the DC motor 180 of the drive assembly 150 of the solar tracker assembly 102. In one exemplary embodiment, the solar tracker controller 602 is mounted to the lower wall 254 of the torque tube beam 250 in the region of the slew drive 160 and includes the following electronics 620 mounted on the printed circuit board 625 within the controller housing 610: a) the microcontroller 635; b) the actuator 630a which, in one exemplary embodiment is the DC motor driver 630, which operates under the control of the microcontroller 635; c) a charge controller 640, which operates under the control of the microcontroller 635, and functions to charge a rechargeable battery 645 of the solar tracker controller 602; and d) an inclinometer or accelerometer 627. In addition to the rechargeable battery 645, the solar tracker controller 602 also includes the relatively small, dedicated photovoltaic module 647 (schematically depicted in FIGS. 2 and 8) which is also mounted to the torque tube beam 250 in the region of the slew drive 160 and the controller housing 610 for charging the battery 645. Finally, as schematically depicted in FIG. 2, the solar tracker controller 602 further includes an electrical cable 615 extending between the controller housing 610 and the DC motor 180. The electrical cable 615 provides an electrical hardwire coupling between the controller electronics 620, specifically, the DC driver 630 and the DC motor 180 such that motor drive signals (current) output by the DC driver actuates the DC motor 180 to thereby rotate the rotatable drive member 170 of the slew drive 160 to change the angle of inclination AI of the table 110 of the associated solar tracker assembly 102. Essentially, the DC driver 630 delivers the appropriate current to the DC motor 180 to rotate the slew drive 160 and cause a desired rotation of the table 100 to achieve a desired table angle of inclination AI.

The motor driver 630 is a semiconductor device which, operating under the control of the microcontroller 635, accurately determines current required to be supplied to the DC motor 180: 1) to accelerate rotation of the output shaft of the DC motor 180, 2) to rotate the output shaft of the DC motor at a given rotational speed, and 3) to decelerate rotation of the output shaft of the DC motor 180. Essentially, the microcontroller 635 of the solar tracker controller 602 commands the motor driver 630 to rotate the table 110 of the solar tracker assembly 102 a desired value (e.g., one degree of rotation of the table 110 in the east direction) and the motor driver 630 executes the command and delivers the appropriate current to the DC motor 180 to cause the desired rotation value of the solar tracker assembly table 110. The printed circuit board 625 is positioned in the controller housing 610 such that when the table 110 of the solar tracker assembly 102 is at a neutral angle of inclination AIN (FIG. 5), that is, AI=0 degrees, the printed circuit board 625 is horizontal. At the neutral angle of inclination AIN, the plurality of photovoltaic modules 190 of the table 110 are horizontal with the upper surfaces of the plurality of photovoltaic modules 190 facing directly up. As the table 110 is rotated by the solar tracker controller 110, via the drive mechanism 150, the accelerometer 627 continuously reports its angle of inclination, which is the same as the table angle of inclination 110, to the microcontroller 635. This angular feedback loop allows the microcontroller 635, via the motor driver 630, to precisely control angular rotation of the output shaft of the DC motor 180, and via the slew drive 160, to precisely control the table angle of inclination AI.

Advantageously, the microcontroller 635 of the solar tracker controller 602, utilizing the feedback loop provided by the accelerometer 627, accurately determines when the motor driver 630 should start and stop the DC motor 180 of the drive mechanism 150. Given that the table 110 has a significant weight or mass, the DC motor 180 must first overcome inertia of the table 110 to commence acceleration, that is, commence rotation of the table 110. Once the table 110 is rotating, there is again inertia or momentum of the table 110 that must be stopped in order to stop rotation of the table 110 at the desired table angle of inclination AI and avoid, for example, overshooting the desired angle of inclination AI. The accelerometer 627 and the feedback loop advantageously help the microcontroller 635 and the motor driver 630 accurately control the table angle of inclination AI. The charge controller 640 manages the charging of the battery 645 by the dedicated photovoltaic module 647 by controlling the output voltage of the dedicated photovoltaic module 647 so that the battery 645 is charged efficiently with a proper current. Advantageously, the electronics and configuration of the solar tracker controller 602 (which applies to all of the solar tracker controllers of the plurality of solar tracker controllers 600) of the solar tracker installation 1000 mitigates the need to run AC power lines to each of the DC motors 180 of the drive mechanisms 150. Alternatively, in place of the DC motor 180, an AC motor may be used to drive the gear train of the slew drive 160.

Solar Tracker Control and Communications System 500

As noted above, the solar tracker installation 1000 includes the solar tracker control and communications system 500 utilizing the central controller or array controller 510 in the star wireless communications network configuration 502 to allow for efficient, centralized control of the installation 1000, while greatly reducing the need for running AC power lines to various components of the installation 1000 thereby reducing installation and maintenance costs. In one exemplary embodiment, the wireless data communications protocol employed by the control system 500 for the network 502 is the long range (LoRa), sub-GHz wireless communications protocol utilizing spread spectrum modulation technology and LoRa wireless communications devices, such as a LoRa gateway and LoRa transceivers or LoRa bridges, facilitating wireless communications between components of the control system 500. Advantageously, the direct or point-to-point wireless RF communications between network nodes in the star network architecture and the long-range wireless communications capability of the LoRa, sub-GHz wireless communications of the control system network 502 enables a central controller or array controller 510 of the solar tracker control system 500 to communicate directly with the other components or nodes of the control system 500 including the plurality of solar tracker controllers 600 and the plurality of weather sensors 700.

In one exemplary embodiment, the array controller 510 includes an enclosure 520 which houses array controller electronics 510*a*. The array controller electronics 510*a* includes a microcontroller 511, a LoRa communication device 512*a* which in one exemplary embodiment, is the LoRa wireless communications gateway 512, which can wirelessly communicate directly or point-to-point with each of the plurality of tracker controllers 600 and each of the plurality of weather sensors 700. The array controller electronics 510*a* also includes a power supply 522, which receives AC power and converts the power to DC appropriate for operating array controller electronics 510*a*, and the router 524 communicating with the cloud storage server 800. The microcontroller 511 may be integrated with the LoRa wireless communications gateway 512 or may be a stand-alone device surface-mounted to a printed circuit board. One suitable LoRa gateway 512 is the MultiTech Conduit® 300 Series IoT Programmable Gateway (MTCDT3AC Series) available from Multi-Tech Systems, Inc., Mounds View, MN.

Each of the plurality of solar tracker controllers 600 includes a LoRa wireless communications device 627 that, in one exemplary embodiment, is a LoRa transceiver 627*a* built into the microcontroller 635 of the solar tracker controller. Specifically, the LoRa communications transceiver 627*a* is integrated into the printed circuit board 625 of the microcontroller 635 and connected to an antenna fabricated into the printed circuit board 625. Each of the plurality of weather sensors 700 includes a LoRa communications device 740. In one exemplary embodiment, each of the plurality of weather sensors 700 includes a LoRa wireless communications bridge or transceiver. A suitable LoRa bridge is the Dragino RS485-LN, available from Dragino Technology Co., LTD, Shenzhen, China.

Also part of the solar tracker control and communications system 500 is the cloud storage server 800 which wirelessly transmits data to the cloud storage database 850. Unlike the other components of the solar tracker control system 500, the cloud storage server 800 and database 850 do not need to be located within the geographic bounds of the solar tracker installation site 1002. The array controller 510 wirelessly transmits or uploads selected tracker operating data 560 to the cloud storage server 800 for storage in the cloud storage database 850. Selected tracker operating data 560 uploaded to the cloud storage server 800 by the array controller 510 for storage in the cloud storage database 850 will be referred to as uploaded or selected tracker operating data 560. The selected tracker operating data 560 will include data selected from tracker operating data 660 and tracker table angle of inclination data 670, along with corresponding solar tracker identification data 650, generated by each of the plurality of solar tracker controllers 600.

In summary, in one exemplary embodiment, the solar tracker control system 500 of the present disclosure includes the following communication network components or nodes: a) the plurality of solar tracker controllers 600, each of which is associated with a respective different solar tracker assembly of the plurality of solar tracker assemblies 100; b) the plurality of weather sensors 700 which transmit weather condition data 720; c) the central controller or array controller 510 which wirelessly communicates directly with each of the plurality of solar tracker controllers 600 and with each of the plurality of weather sensors 600 in the star communications configuration 502; and d) the aforementioned cloud storage server 850 and associated with a cloud storage database 850, the cloud storage database 850 being accessed by the cloud storage server 850. As noted above, each of the solar tracker controllers of the plurality of solar tracker controllers 600 is associated with a respective solar tracker assembly of the plurality of solar tracker assemblies 100. That is, in one exemplary embodiment of the solar tracker control system 500 of the present disclosure, there is a unique, one-to-one correspondence between each solar tracker controller 602, 604, 606, 608 of the plurality of solar tracker controllers 600 and each solar tracker assembly 102, 104, 106, 108 of the plurality of solar tracker assemblies 100. It should be recognized that, in an alternative embodiment, a single solar tracker controller, for example, solar tracker controller 602, may be associated with and will control the table angle of inclination AI of more than one solar tracker assembly of the plurality of solar tracker assemblies 100. For example, in an alternate exemplary embodiment, solar tracker controller 602 may be associated with two (or more) solar tracker assemblies, for example, solar tracker assemblies 102, 104. In such an alternate embodiment, electrical cables, like electrical cable 615 must provide a hardwired connection between the motor driver 630 of the solar tracker controller 602 and the respective DC motors of each of the solar tracker assemblies 102, 104 under the control of the solar tracker controller 602.

Advantageously, the cloud storage server 800 which accesses a cloud storage database 850, allows remote, wireless access to data stored on the cloud storage database 850 regarding the operation, control, status, maintenance requirements, etc. of the solar tracker installation 1000 by local or remote users via smart devices 900 such as desktops, laptops, notebook computers, smart phones, and other similar devices which run appropriate application programs/software 902 to allow access to the cloud storage server 800 and thereby access data in the cloud storage database 850. Unlike other components of the solar tracker control system 500, the cloud storage server 800, the cloud storage database 850 and the remote smart devices 900 do not need to be geographically located at the site 1002 of the solar tracker installation 1000.

Figure 8:
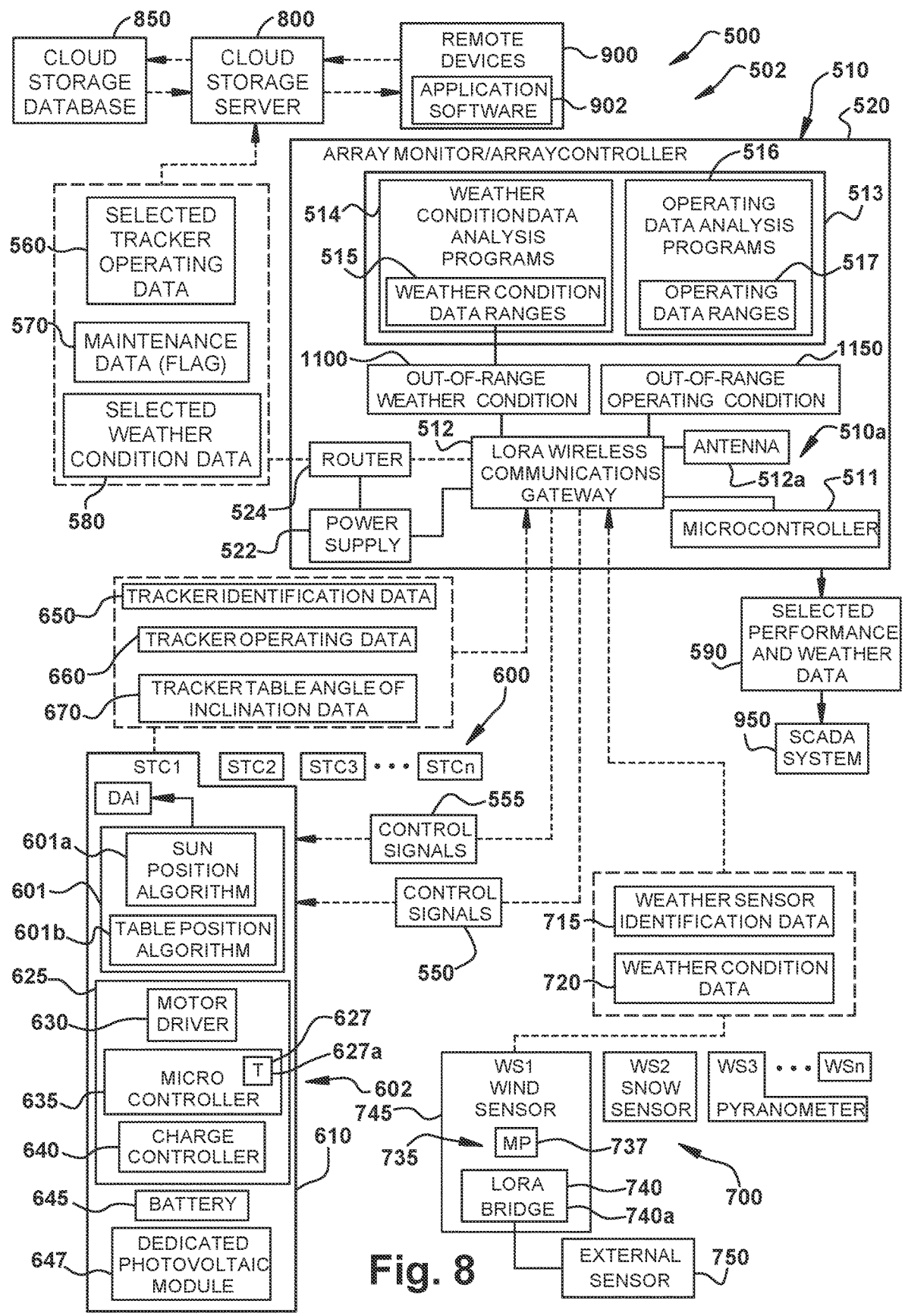
FIG. 8 is a simplified, diagrammatic view of the star configuration, wireless control and communication system of the solar tracker installation of FIG. 1 illustrating data and control signal transmission in connection with various functions of the control system and interaction with selected components of the solar tracker installation of FIG. 1.

As diagrammatically depicted in FIG. 8, the array controller 510 also wirelessly transmits or uploads selected weather condition data 580 (along with corresponding weather sensor identification data 720) to the cloud storage server 800 for storage in the cloud storage database 850. Selected weather condition data 580 uploaded to the cloud storage server 800 by the array controller 510 for storage in the cloud storage database 850 will be referred to as uploaded or selected weather condition data 580. Additionally, if the array controller 510 determines that a particular solar tracker assembly, for example, solar tracker assembly 102 requires maintenance, maintenance data and/or a maintenance flag 570 will be wirelessly transmitted or uploaded (along with corresponding solar tracker identification data 650) to the cloud storage server 800. Solar tracker maintenance data 570 uploaded to the cloud storage server 800 by the array controller 510 for storage in the cloud storage database 850 will be referred to as uploaded or selected tracker maintenance data 570.

In one exemplary embodiment of the solar tracker control system 500, the array controller 510 includes the LoRa wireless communications gateway 512, a microcontroller 511 and associated software/firmware 513, typically installed by the manufacturer. The array controller software/firmware 513 includes weather condition data analysis programs 514 for analyzing weather condition data 720 wirelessly transmitted by the plurality of weather sensors 700 to the array controller 510 and operating data analysis programs 516 for analyzing tracker operating data 660 and tracker table angle of inclination data 670 wirelessly transmitted by the plurality of solar tracker controllers 600 to the array controller 510. With respect to analysis of weather condition data 720, the array controller 510 executes the weather condition data analysis programs 514 and utilizes weather condition data ranges 515 to determine if an out-of-range weather condition exists. With respect to analysis of operating data analysis programs 516, the array controller 510 executes the operating condition data analysis programs 514 and utilizes operating condition data ranges 517 to determine if an out-of-range operating condition exists. Depending on the size of the installation 1000 and the desire for redundancy to improve the reliability of the solar tracker control system 500, the solar tracker control system 500 may utilize two (or more) array controllers 510, each including a LoRa wireless communications bridge 512. In the event that one of the array controllers 510 fails, the solar tracker control system 500 could maintain essential operations with a single remaining operating array controller 510.

Each of the plurality of solar tracker controllers 600, for example, representative solar tracker controller 602, wirelessly communicates with the array controller 510. In the "up" direction the solar tracker controller 602 wirelessly transmits data to the array controller 510, including the following data: a) solar tracker identification data 650, uniquely identifying the solar tracker controller and the associated solar tracker assembly, for example, identification data identifying solar tracker assembly 102 and its associated with solar tracker controller 602; b) operating data 660 regarding the operation and performance of the solar tracker assembly 102, hereinafter referred to as solar tracker operating data or tracker operating data 660; and c) solar tracker table angle of inclination data 670 regarding the table angle of inclination AI, hereinafter referred to as solar tracker table angle of inclination data or tracker angle of inclination data 670. The tracker assembly operating data 660 and tracker table angle of inclination data 670 (along with, of course, the tracker identification data 650) may be communicated by the controller 602 to the array controller 510 at predetermined, periodic times or on a dynamic, ad hoc basis, if the controller 602 senses a problem with the operation or performance of the associated solar tracker assembly 102. Advantageously, each solar tracker controller, for example, representative solar tracker controller 602, of the plurality of tracker controllers 600, includes software/firmware 601 installed by the manufacturer and executed by the microprocessor or microcontroller 635 of the solar tracker controller 602 during its operation.

In one exemplary embodiment, included in the installed software/firmware 601 of the solar tracker controller 602 includes a preprogrammed sun position algorithm 601a and a table position algorithm 601b, which are executed by the microcontroller 635 of the solar tracker controller 602 to periodically determine a desired table angle of inclination DAI (FIG. 8). In one exemplary embodiment, the microcontroller 635 determines the desired table angle of inclination DAI and then, utilizing the motor driver 630, repositions the table angle of inclination AI to the desired table angle of inclination DAI for its associated solar tracker assembly 102, as the sun changes angular position in the sky during the period from sunrise to sunset. During night hours, the table angle of inclination AI is set to a predetermined night position, typically the neutral table angle of inclination AIN, thus, it is not necessary for the microcontroller 635 to recalculate the desired table angle of inclination DAI during nighttime hours. The solar tracker controller 602 periodically outputs to the array controller 510 tracker table angle of inclination data 670 for the solar tracker assembly 102, to provide a data history of the table angle of inclination AI of the solar tracker assembly 102 over time. For example, actual table angle of inclination data 670 could be is transmitted to the array controller 510 by the solar tracker 102 every four minutes during daylight hours. This direct, wireless transmission of actual table angle of inclination data 670 every four minutes to the array controller 510 is undertaken by each of the plurality of solar tracker controllers 602 for each respective associated solar tracker assembly of the plurality of solar tracker assemblies 100. It should be understood, however, that in an alternate exemplary embodiment, the sun position algorithm 601 and the table position algorithm 601b for each of the plurality of solar tracker controllers 600 could be stored in a memory of the array controller 510 and executed by the microcontroller 511. In such an alternate exemplary embodiment, appropriate control signals would be sent periodically by the array controller 510 to each of the plurality of solar tracker controllers 600 to move the respective tables 110 to respective desired table angles of inclination DAI for each of their associated solar tracker assemblies 100.

The array controller 510 wirelessly communicates control signals 550, 555, as required, to one or more solar tracker assemblies of the plurality of solar tracker controllers 600 when the array controller 510 has determined that action is required with respect to one or more of the solar tracker assemblies of the plurality of solar tracker assemblies 100 under the control and supervision of the array controller 510. The control signals 550 are weather-related control signals, wirelessly communicated by the array controller 510 to selected solar tracker controllers 609 associated with selected solar tracker assemblies 109 that are within an affected region of the installation site 1102 where an out-of-range weather condition 1100 has been determined to exist based on analysis of weather condition data 720 by the array controller 510. The weather-related control signals 550 command the selected solar tracker controllers 609 to take some action with respect to their associated selected solar tracker assemblies 609, for example, to change the solar tracker table angles of inclination AI to a position that will mitigate potential damage to the plurality of photovoltaic modules 190 of the selected solar tracker assemblies 609. The control signals 555 are operating data-related or operating condition control signals directly and wirelessly communicated by the array controller 510 to a specific solar tracker controller, for example, solar tracker controller 602, where the array controller 510 has analyzed tracker operating data 660 and/or tracker table angle of inclination data 670 and determined that the associated solar tracker assembly 102 is experiencing an out-of-range operating condition 1150 wherein repair or maintenance is required for the associated solar tracker assembly 102. The operating condition control signals 555 command the affected, specific solar tracker controller 602 to take some action with respect to its associated specific solar tracker assembly 602, for example, to change the solar tracker table angle of inclination AI for the solar tracker assembly 102 to a maintenance position and/or to discontinue operation of the solar tracker assembly 102 until appropriate repair and/or maintenance of the solar tracker assembly 102 is completed.

The amplify on the discussion above, for example, if a weather sensor, for example, representative weather sensors 702 of the plurality of weather sensors 700, in the vicinity of the solar tracker assemblies 102, 104, 106 transmits weather condition data 720 indicating a high wind condition, the array sensor 510, utilizing weather condition data analysis programs 514 and associated weather condition data ranges 515, determines that an out-of-range wind condition exists within an affected portion 1002a (FIG. 1) of the installation site 1002, the array controller 510 will directly and wirelessly communicate weather-related control signals 550 to the selected solar tracker controllers 602, 604, 606 with the affected portion 1002a of the installation site 1002 to actuate the drive mechanisms 150 of the selected solar tracker assemblies 102, 104, 106 to rotate or pivot the tables 110 of the selected solar tracker assemblies 102, 104, 106 to a wind stow table angle of inclination position to mitigate potential damage to the selected solar tracker assemblies 102, 104, 106, specifically, the plurality of photovoltaic modules 190 associated with the selected solar tracker assemblies 102, 104, 106. The selected solar tracker assemblies 609 hereinafter will be referred to as selected solar tracker assemblies or select solar tracker assemblies. Similarly, the selected group [of solar tracker controllers 609 hereinafter will be referred to as selected solar tracker controllers or select solar tracker controllers.

Of course, it should be understood, the depending on the weather condition data 720 and the weather condition data analysis programs 514 and the weather condition data ranges 515 utilized, the out-of-range weather condition 1100 may result in weather-related control signals 550 being sent to all of the plurality of solar tracker controllers 600 in the installation site 1000. For example, an out-of-range wind condition affecting the entirety of the installation site 1000 requires all of the plurality of solar tracker assemblies 100 in the installation site 1000 to rotate to a wind stow position. In such a case, the select group of solar tracker controllers 609 would include all of the plurality of solar tracker controllers 600 and the select group of solar tracker assemblies 609 would include all of the plurality of solar tracker assemblies 100.

Each weather sensor of the plurality of weather sensors 700, for example, representative weather sensor 702, periodically wirelessly transmits to the array controller 510 the following data: a) weather sensor identification data, uniquely identifying the weather sensor 702; and b) weather condition data 720 output by the weather sensor 702. For example, if the weather sensor 702 is an anemometer weather condition data 720 may include wind speed and wind direction. The array controller 510 receives the weather condition data 720 directly and wirelessly transmitted from each of the weather sensors of the plurality of weather sensors 700. Weather condition data 720 generated by the plurality of weather sensors 700 positioned about the solar tracker assembly installation site 1002 will include wind speed data, sunlight data, and snow accumulation data.

With regard to solar tracker assembly operation and performance and maintenance, the array controller 510 once again performs analysis and control functions. If the solar tracker controller 602 transmits operating data 660 and/or tracker table angle of inclination data 670 to the array controller 510 and the array controller 510, utilizing the operating data analysis programs 516 and the operating data ranges 517, determines that the solar tracker assembly 102 is experiencing an out-of-range operating condition 1150, that is, the solar tracker assembly 102 is outside of proper operating data ranges/malfunctioning and/or requires maintenance, the array controller 510 will transmit operating condition control signals 555 to the specific solar tracker controller 602 to pivot the table 110 of the specific solar tracker assembly 102 to a maintenance hold position and, if required, discontinue operation of the solar tracker assembly 102 until appropriate maintenance/repair can be performed on the solar tracker assembly 102. The out-of-range operating condition 1150 determined by the array controller 510 could be, for example, an unacceptable low power output being output by the assembly 102 or some problem with the associated solar tracker controller 602, for example, the rechargeable battery 645 of the solar tracker controller 602 is malfunctioning or at the end of its useful life. If an out-of-range operating condition 1150 is determined by the array controller 510 with respect to specific solar tracker assembly 102, the array controller 510 transmits wireless operating condition control signals 555 to specific solar tracker controller 602 to rotate the table 110 of the specific solar tracker assembly 102 change the table angle of inclination AI to an angle of inclination corresponding to a maintenance position or maintenance hold position until appropriate maintenance action can be performed on solar tracker assembly 102.

Each solar tracker controller of the plurality of solar tracker controllers 600, for example, representative solar tracker controller 602, periodically wirelessly transmits to the array controller 510 the following data: a) tracker identification data 650, uniquely identifying the solar tracker assembly 102 and the associated solar tracker controller 602; b) tracker operating data 660 (including solar tracker performance data, maintenance data, etc.; and c) tracker table angle of inclination data 670 corresponding to the actual table angle of inclination AI for the solar tracker assembly 102. For example, if the weather sensor 702 is an anemometer weather condition data 720 may include wind speed and wind direction. The array controller 510 receives the operating data 660 and table angle of inclination data 670 wirelessly transmitted from each of the solar tracker controllers of the plurality of solar tracker controllers 600. Regarding tracker table angle of inclination data 670, during daylight hours, each solar tracker assembly, for example, the solar tracker assembly 102, rotates its table 110 every four minutes to track the position of the sun. Thus, the associated solar tracker controller 602 transmits the angular position of the table and the time of day/date to the array controller 510 every four minutes during daylight hours. Solar tracker operating data 660 may also include performance data such as the current operating status/power output of the solar tracker assembly 102. Solar tracker operating data 660 may also include data indicating that maintenance is required to some component of the solar tracker assembly 102 or a notification that maintenance to a component will be required at a certain future time.

Transmission of tracker operating data 660, table angle of inclination data 670, and weather condition data 720 to the array controller 510 are examples of data transmitted in the solar tracker control and communications system 500 in the "upward" direction directly and wirelessly to the array controller 510, while transmission of control signals 550, 555 from the array controller 510 to the plurality of solar tracker controllers 600 are examples of data (control signals) transmitted directly and wirelessly in the "downward" direction from the array controller 510 to the plurality of solar tracker controllers 600. Similarly, the array controller 510 directly and wirelessly transmits or uploads selected weather condition data 720 (along with corresponding weather sensor identification data 715), selected tracker operating data 660, and selected tracker table angle of inclination data 670 to the cloud storage server 800 for storage in the cloud storage database 850. As diagrammatically depicted in FIG. 8, such selected weather condition data uploaded to the cloud storage server 800 by the array controller 510 for storage in the cloud storage database 850 will be referred to as uploaded or selected weather condition data 580, while selected operating data and tracker table angle of inclination data uploaded to the cloud storage server 800 for storage in the cloud storage database 850 will be referred to as uploaded or selected tracker operating data 560. Data uploaded to the cloud storage server 800 for storage in the cloud storage database 850 relating to maintenance actions that need to be taken, sometimes referred to as maintenance flags, for a specific solar tracker assembly or solar tracker controller will be referred to as uploaded or selected maintenance data or maintenance flag data 570. Additionally, the array controller 510 directly and wirelessly transmits or uploads selected control signals or control commands 550, 555 to the cloud storage server 800 for storage in the cloud storage database 850.

Advantageously, storage of selected operating, maintenance and weather condition data 560, 570, 580, along with storage of selected control signals or control commands 550, 555 permits access to data stored on the cloud database 850 regarding the operation, performance, status, maintenance requirements, control signals/commands issued, etc. of the solar tracker installation 1000 by local or remote users. Such users access selected stored data 550, 555, 560, 570, 580 from the database 850 through the cloud storage server 800 via smart devices 900 such as desktops, laptops, notebook computers, smart phones, and other similar devices which run appropriate application programs/software 902. Such apps 902 are resident on smart devices 900 allow wireless access to selected stored data 550, 555, 560, 570, 580 via the cloud storage server 800 which, in turn, accesses and retrieves requested data from the cloud storage database 850. An additional, non-wireless, transmission of summary data regarding the overall performance of the solar tracker installation 1000 from the array controller 510 to a device referred to as a Supervisory Control and Data Acquisition system 950 (SCADA system) optionally may also be part of the solar tracker control system 500. Typically, the operator of the solar tracker installation demands certain summary performance and weather condition data 950 be directly communicated to the SCADA system 950 to allow for monitoring the overall performance of the solar tracker installation 1000, without the need for accessing data stored in the cloud storage database 850. The SCADA system 950, as part of the solar tracker control system 500, is diagrammatically depicted in FIG. 8.

Figure 6:
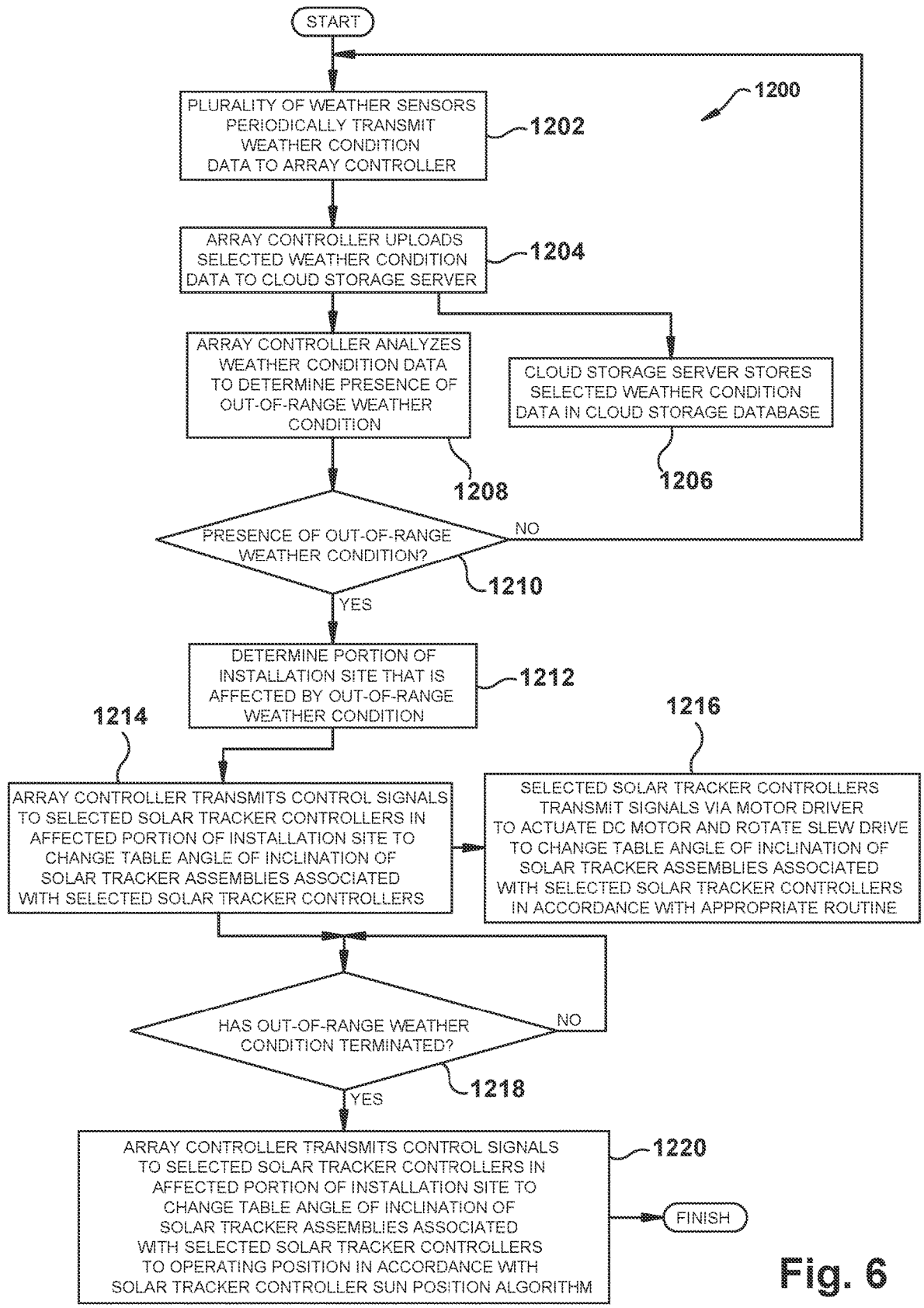
FIG. 6 is a is a simplified flow chart illustrating data and control signal communications of the wireless control and communications system of the present disclosure relating to weather condition data transmitted to the array controller/central controller by the plurality of weather sensors of the solar tracker installation of FIG. 1.

The simplified flow chart of FIG. 6 diagrammatically illustrates the flow of data, in one exemplary embodiment, within the solar tracker control system 500 relating to analysis of weather condition data 720 and transmission of weather-related control signals 550 by the array controller 510 and the storage of selected weather condition data 580 by the array controller 510. In the control system 500 of the present disclosure, the array controller 510 periodically receives from each of the plurality of weather sensors 700, for example, representative weather sensor 702 would transmit the following data regarding weather sensor 702 to the array controller 510: a) weather sensor identification data 715 to identify the weather sensor 702; and b) weather condition data 720 from the weather sensor 702. If the array controller 510 determines that the weather condition data 720 transmitted by the weather sensor 702 exceeds predetermined weather condition data values 730, the array controller 510 transmits control signals to one or more of the plurality of tracker controllers 600 to change the associated solar tracker assembly table angle of inclination AI, for example, if predetermined wind speed data values are exceeded, sending control signals to one or more of the plurality of solar tracker controllers to change the table angles of inclination of the associated solar tracker assemblies to a wind stow angle of inclination position.

At night, the table would be pivoted to a "night stow position". Under high wind conditions, the table would be pivoted to a "wind stow position" that seeks to minimize potential damage to the plurality of photovoltaic modules by moving to the table and thus the modules to a relative shallow angle of inclination, facing the wind. If a weather sensor, such as an anemometer, senses a high wind condition and data concerning the high wind condition is transmitted to the solar tracker assembly controller, the controller may transmit control signals to the drive mechanism to pivot the table to the stow angle of inclination position in the direction of the wind. By contrast, if a weather sensor, such as a pyranometer, senses an overcast sky condition and data concerning the overcast condition is transmitted to the solar tracker assembly controller, the controller may transmit control signals to the drive mechanism to pivot the table to the neutral (horizontal) angle of inclination position as there is no sun to track under overcast conditions and more solar energy may be collected by leaving the photovoltaic modules in a horizontal position where a maximum of ambient illumination is received by the photovoltaic modules. Other types of weather sensors may also be utilized at the site 1002, such as a snow sensor. If snow is sensed on the upper surface of a photovoltaic module of a solar tracker assembly, the controller may initiate a snow dump routine to remove snow deposited on the solar tracker assembly's plurality of photovoltaic modules.

Specifically, with reference to FIG. 6, at step 1202, each of the plurality of weather sensors 700 periodically wirelessly transmit weather condition data 720 to the array controller 510. Each weather sensor, for example, weather sensor 702, also transmits unique weather sensor identification data which allows the array controller 510 to ascertain which weather sensor is transmitting weather condition data 720 and where the weather sensor 702 is located within the solar tracker installation site 1002. At step 1204, the array controller 510 wirelessly transmits or uploads selected weather condition data 580 to the cloud storage server 800 for storage in the cloud storage database 850. The selected, uploaded weather condition data 580 may include all, a subset, or a summarization or characterization of the weather condition data 720. At step 1206, the cloud storage server 800 stores the selected weather condition data 580 to the cloud storage database 850.

At step 1208, the array controller 510, using the weather condition data analysis programs 514 and the weather condition data ranges 515, analyzes the weather condition data 720 to determine, among other things, if an out-of-range weather condition 1100 exists within the solar tracker installation site 1002. If no out-of-range weather condition 1100 is ascertained by the array controller 510, the process returns to step 1202. If an out-of-range weather condition 1100 is ascertained by the array controller 510, then at step 1212, the array controller 510 determines a portion 1002*a* of the solar tracker installation site 1002 that is affected by the out-of-range weather condition 1100 such that action may be taken to mitigate potential damage to the solar tracker assemblies within the affected portion 1002*a* of the site 1002 (e.g., damage resulting from a high wind weather condition may be mitigated by rotating the solar tracker table 110 to a wind stow position) and/or to mitigate performance degradation of the solar tracker assemblies with the affected portion 1002*a* of the site 1002 (e.g., decreased energy output resulting from snow accumulation on upper surfaces of the photovoltaic modules 190 of a solar tracker table 110 may be mitigated by rotating the solar tracker table 110 through a snow dump routine). The affected portion 1002*a* may be the entire installation site 1002 (high winds present across the site 1002) or the affected portion may be 1002*a* one or more parts or sections of the site 1002.

At step 1214, the array controller 510 wirelessly transmits control signals 550 to selected solar tracker controllers 609 within the affected portion 1002*a* of the installation site 1002. The control signals 550 cause the selected solar tracker controllers 609 to change the angle of inclination AI of the tables 110 of the solar tracker assemblies 109 (hereafter selected solar tracker assemblies 109) corresponding to or associated with the selected solar tracker controllers 609. For example, if the out-of-range weather condition 1100 is a high wind condition, the control signals 550 would result in the selected solar tracker controllers 609 rotating the angle of inclination AI of the tables 110 of the selected solar tracker assemblies 109 to a wind stow position. If the out-of-range weather condition 1100 is a snow accumulation condition wherein snow has fallen on the upper surfaces of the plurality of photovoltaic modules 190, the control signals 550 would result in the selected solar tracker controllers 609 (FIG. 1) rotating the angle of inclination AI of the tables 110 in conformity with a snow dump routine (moving the solar tracker table through the table angle of inclination range AIR to effect snow removal from upper surfaces of the plurality of photovoltaic modules 190) in an attempt to rid the plurality of photovoltaic modules 190 of accumulated surface snow. If the out-of-range weather condition 1100 is an overcast sky, the control signals 550 would result in the selected solar tracker controllers 609 rotating the angle of inclination AI of the tables 110 of the selected solar tracker assemblies 109 to an overcast sky position, which is typically a horizontal or near horizontal angle of inclination AI. In an overcast sky condition, it is preferable to leave the plurality of photovoltaic modules 190 in a horizontal position, as opposed to attempting to track the sun across the sky. In an overcast sky weather condition, the affected portion 1002*a* of the installation site 1002 may include the entirety of the site 1002, that is, all of the plurality of solar tracker controllers 600 of the site would because all of the plurality of solar trackers 100 in the installation site 1002 would be experiencing an overcast sky condition. Thus, under such a widespread overcast sky condition, the selected solar tracker assemblies 109 would include all of the plurality of solar tracker assemblies 100 and the selected solar tracker controllers 609 would include all of the plurality of solar tracker controllers 600 and the affected portion 1002a of the installation site 1002 would include the entirety of the installation site 1002.

At step 1216, the selected solar tracker controllers 609 utilize the motor driver 630 (FIG. 8) to transmit signals to actuate the DC motor 180 such that rotation of an output shaft of the DC motor 180 cause a desired angular rotation of the rotatable member 170 of the slew drive 160 and, therefore, a desired resulting angle of inclination AI of the solar tracker tables 110 of the associated solar tracker assemblies 109. The array controller 510 continues to receive weather condition data 720 and weather sensor identification data 715 from the plurality of weather sensors 600 and, at step 1218, at such time as the out-of-range weather condition terminates, that is, the array controller 510 determines that the weather condition data 720 is back within predetermined weather condition ranges 515, then at step 1220, the array controller 510 transmits control signals 550 to the selected solar tracker controllers 609 in the affected portion 1002a of the installation site 1002 to change the table angle of inclination AI of the selected solar tracker assemblies 109 to a "normal" or the desired table angle of inclination DAI in accordance with the solar tracker controller sun position algorithm 601a and the table position algorithm 601b of each of the selected solar tracker controllers 609. The process 1200 returns to step 102 as the array controller 510 continues to receive weather condition data 720 wireless transmitted by the plurality of weather sensors 600.

Figure 7:
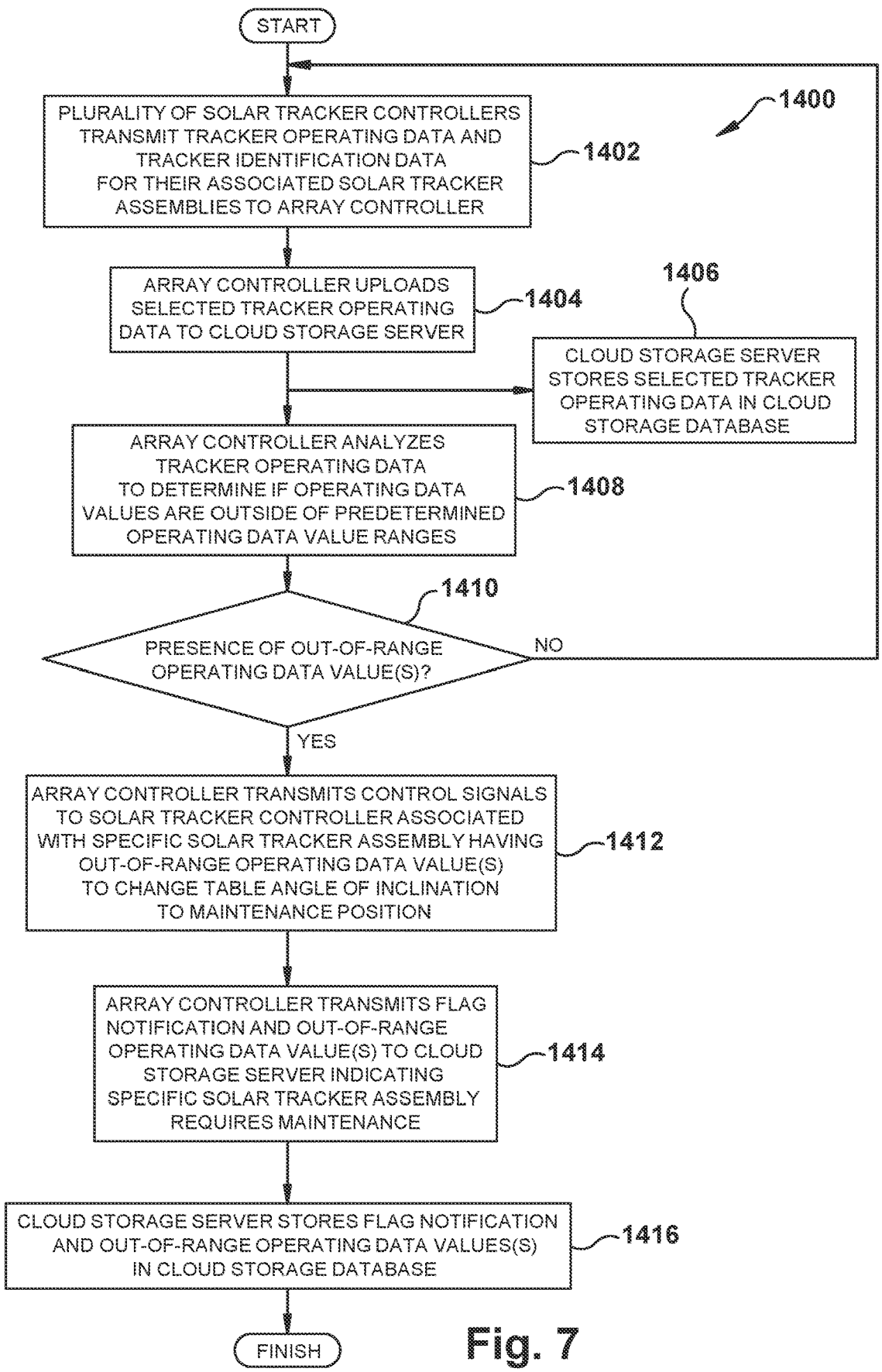
FIG. 7 is a simplified flow chart illustrating data and control signal communications of the wireless control and communications system of the present disclosure relating to solar tracker operating data transmitted to the array controller/central controller by the plurality of solar tracker controllers of the solar tracker installation of FIG. 1.

The simplified flow chart of FIG. 7 diagrammatically illustrates the flow of data (including control signals), in one exemplary embodiment, within the solar tracker control system 500 relating to analysis of tracker operating data 660 and tracker table angle of inclination data 670 and transmission of operating condition or operating data-related control signals 555 by the array controller 510 and the storage of selected tracker operating data 560 (including tracker performance data) and maintenance data 570 by the array controller 510. In the control system 500 of the present disclosure, the array controller 510 periodically receives from each of the plurality of solar tracker controllers 600, for example, representative solar tracker controller 602 the following data: a) solar tracker identification data 650 to identify the solar tracker assembly 102; b) tracker operating data 660 for the solar tracker assembly 102; and c) tracker table angle of inclination data 670 for the angle of inclination AI of the table 110 of the solar tracker assembly 102. The flow of the operating data 660 and tracker table of inclination data 670 and subsequent processing of that data 660, 670 by the array controller 510 and transmission of operating data-related control signals 555 to the plurality of solar tracker controllers 600 and uploading of operating data 560 and maintenance data 570 to the cloud storage server 800 is shown generally at 1400 in FIG. 7.

Specifically, referring to FIG. 7, at step 1402, each of the plurality of solar tracker controllers 600 periodically wirelessly transmit tracker operating data 660 and solar tracker identification data 650 to the array controller 510. That is, solar tracker controller 602 periodically transmits operating data 660 and solar tracker identification data 650 regarding the controller's associated solar tracker assembly 102. The tracker operating data 660 includes tracker table angle of inclination data 670 for the associated solar tracker assembly 102. Each of the plurality of solar tracker controllers 600, for example, solar tracker controller 602 is preprogrammed with the sun position algorithm 601a which generates a sun position table indicating where the sun is positioned throughout the day for each day of the expected operating life of the controller 602. The controller 602 also includes the table position algorithm 601b which allows the controller 602 to periodically calculate, throughout the day, the desired angle of inclination DAI (FIG. 8) of the table 110 of its associated solar tracker assembly 102. When the solar tracker assembly 102 is installed on site, various values are input to the microcontroller 635 of the solar tracker assembly 102 including, for example, the height of the table 110 of the solar tracker assembly 102 above the ground, the distance between the table 110 of the solar tracker assembly 102 and tables of adjacent solar tracker assemblies, etc. The table position algorithm 601b is periodically executed by the solar tracker controller 102, as the angular position of the sun changes throughout the day, to determine the desired table angle of inclination DAI for the solar tracker assembly 102. That is, the desired table angle of inclination DAI may deviate from what otherwise would be the table angle of inclination AI if the goal of the controller 602 were simply to track the position of the sun as it moves across the horizon from east to west. For example, depending on the height of the table 110 of the solar tracker assembly 102 and the distance between the table 110 of the solar tracker assembly 102 and tables of adjacent solar tracker assemblies, it may be desirable to alter the table angle of inclination AI to, for example, avoid shading of the photovoltaic modules 190 of adjacent solar tracker assembly tables, which otherwise might occur during sunrise or sunset periods when table 110 would be at maximum positive or maximum negative angles of inclination AI+, AI−. The table position algorithm 601b takes these factors, among others, into account when periodically calculating the desired angle of inclination DAI of the table 110. Thus, while the solar tracker controller 602 knows the position of the sun at any given time by virtue of the sun position algorithm 601a, by executing the table position algorithm 601b, the desired table angle of inclination DAI is periodically calculated throughout the day as the sun changes its angular position with respect to the horizon. Accordingly and advantageously, the calculated, desired table angle of inclination DAI takes into account the installation conditions (table height, tracker assembly spacing, etc.) of the associated solar tracker assembly 102. The desired table angle of inclination DAI for a given solar tracker assembly table may also be partially determined by the need for "overshooting and backtracking", as explained in U.S. Pat. No. 11,300,979 to Kesler et al., issued Apr. 12, 2022 ("the '979 patent") and assigned to the assignee of the present application. The '979 patent is incorporated by reference herein in its entirety.

At step 1404, the array controller 510 uploads selected tracker operating data 560 and maintenance data 570 to the cloud storage server 800. This selected data 560, 570 including data relating to solar tracker table angle of inclination, tracker performance data indicating how the solar tracker assembly is outputting power and otherwise performing and required tracker maintenance. At step 1408, the array controller 510 utilizing operating data analysis programs 516 stored as software or firmware on the array controller 510, the analyzes the tracker operating data 660 and tracker table angle of inclination data 670 to determine if operating data values for any of the plurality of solar tracker assemblies 100 is outside of predetermined operating data ranges 517 indicating that an out-of-range operating condition 1150 exists for the solar tracker assembly 102. If condition 1100 exists within the solar tracker installation site 1002. If, at step 1410, no out-of-range operating condition 1150 is ascertained by the array controller 510, the process returns to step 1402. If, however, at step 1410, the array controller determines an out-of-range operating condition 1150, that is, the solar tracker assembly 102 is not operating correctly and/or tracker maintenance is required, then at step 1412, the array controller 510 transmits control signals 555 to the specific associated solar tracker controller, namely, solar tracker controller 602 to change the table angle of inclination AI of the solar tracker assembly 102 to a maintenance position angle of inclination. Additionally, at step 1414, the array controller 510 transmits a maintenance flag notification 570 for the specific solar tracker assembly 102 and selected (out-of-range) operating data 560 is transmitted by the array controller 510 to the cloud storage server 800 indicating that the specific solar tracker assembly 102 requires maintenance. At step 1416, the cloud storage server 800 stores the maintenance flag notification 570 identifying the specific solar tracker assembly 102 requiring maintenance, along with the corresponding selected (out-of-range) operating data 560 to provide information to repair/maintenance personnel as to the nature of the required maintenance needed for the specific solar tracker assembly 102, in the cloud storage database 850. The maintenance flag notification/out-of-range data 570/560 stored in the cloud storage database 850 is remotely accessible to repair/maintenance personnel via remote via remote smart devices 900 having appropriate application software 902 installed on the devices 900.

Second Example Embodiment—Control System
2500

Figure 9:
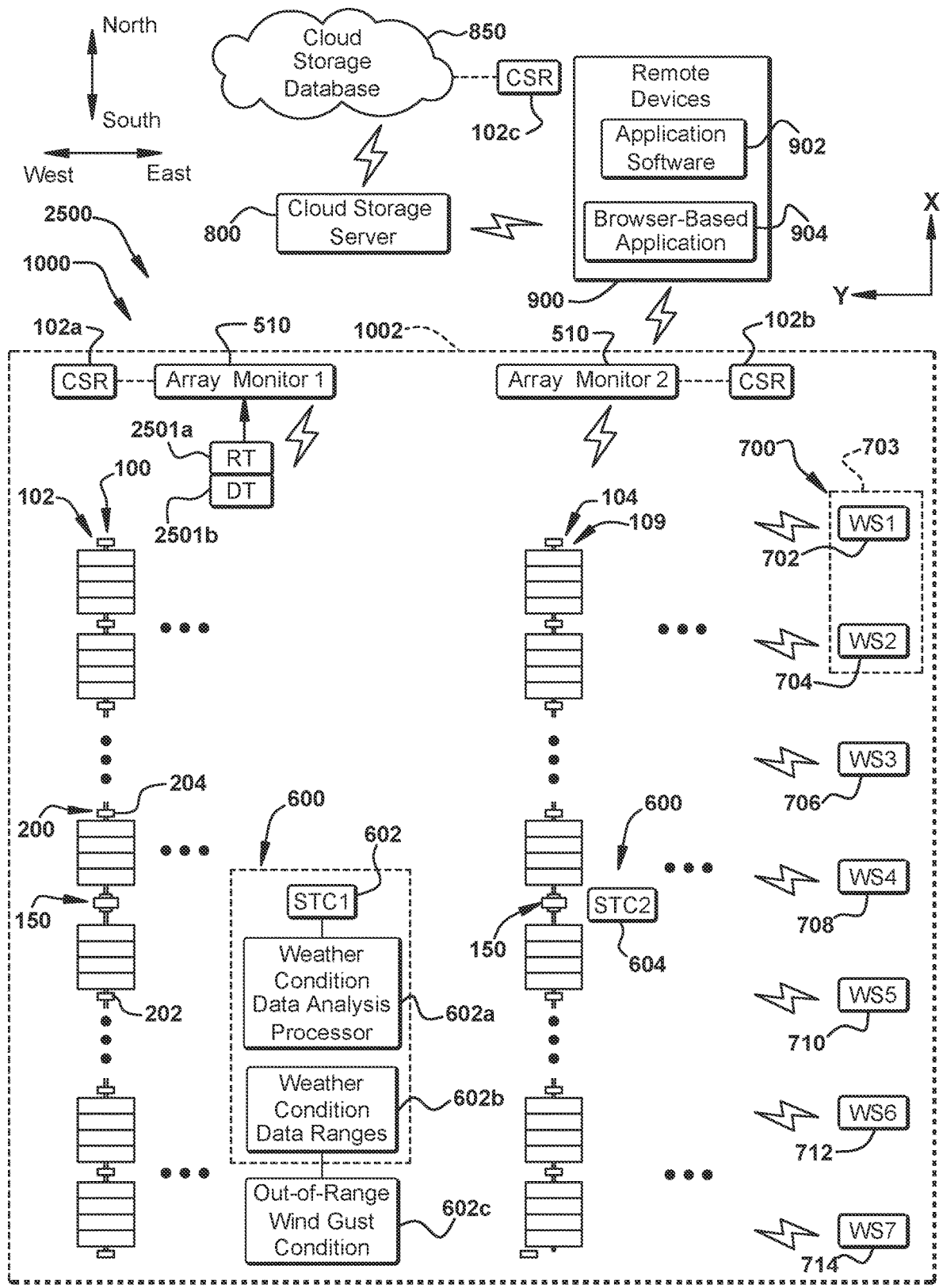
FIG. 9 is a second example embodiment of the control and communications system of the present disclosure utilized in connection with the solar tracker installation of FIGS. 1-5, the wireless control and communication system including a pair of array controllers/central controllers, a cloud storage server and cloud storage database, and the plurality of solar tracker controllers, the control and communications system utilized for control and communications in the solar tracker installation, the installation including the plurality of horizontal, single axis solar tracker assemblies and associated solar tracker controllers, and the plurality of weather sensors located on the installation site.

A second exemplary embodiment of a solar tracker control and communications system 2500 (hereinafter also alternately referred to as "solar tracker control system" or "control system") of the present disclosure is schematically depicted in FIG. 9. The features and functions of the solar tracker installation 1000, including, but not limited to, the plurality of solar tracker assemblies 100, the plurality of solar tracker controllers 600, and the plurality of weather sensors 700 are substantially similar to what was described above in the first example embodiment and, for brevity, will not be repeated and are understood to be applicable to the following description. Like the solar tracker control and communications system 500 of the first example embodiment described above, the solar tracker controller system 2500 employs the long-range, radio frequency, sub GHz, wireless data communications protocol and a star wireless communications network configuration 2502, as described previously. Again, the features and functions of the solar tracker control and communications system 500 are substantially similar to what was described above in the first example embodiment, as described in the first example embodiment above, are incorporated herein. For brevity, only selected differences/additions will be described.

The solar tracker control and communications system 2500 includes certain features and additions providing for: a) improved system reliability, both as to the control system 2500 and the operation of the solar tracker installation 1000 generally; b) the ability to operate the plurality of solar tracker assemblies 100 and associated solar tracker controllers 600 of the solar tracker installation 1000 for a longer period of time in the event of loss of power or an internet failure that precludes communication with the cloud storage database 850 via the cloud storage server 800; and c) enhanced capability of both controlling and performance monitoring of the plurality of solar tracker assemblies 100 of the solar tracker installation 1000 via remote user access.

The solar tracker control and communications system 2500 includes first and second array controllers or central controllers 510, 2510. In one example embodiment, both array controllers 510, 2510 operate in parallel, each performing all of the functions of the array controller 510, as described in the first embodiment. For example, if the solar tracker installation 1000 included a total of 2,000 solar tracker assemblies 100, the first array controller or array monitor 510 could be assigned the communications and control functions of 1,000 of the 2,000 solar tracker assemblies 100, while the second array controller 2510 could be assigned the communications and control functions of the remaining 1,000 solar tracker assemblies of the 2,000 solar tracker assemblies 100 of the installation site 100. If either of the two array controllers 510, 2510, for example, array controller 510 experiences a problem/outage where it can no longer perform all of its required communications and control functions, responsibility for its 1,000 solar tracker assemblies would be shifted to the other of the two array controllers 510, 2510, that is, array controller 2510. Alternately, in an alternative example embodiment, the second array controller 2510 could be simply operated for redundancy purposes, that is, in case the array controller 510 goes down. That is array controller 510 would be assigned responsibility for all solar tracker assemblies 100 of the installation site 10000 and, in the event of an operational failure, array controller 2500 would be brought into service to replace the functionality of the non-functioning array controller 510. The second array controller 2510 could, for example, monitor the operation of the first array controller 510 and, in the event that the second array controller 2510 determines that the first array controller 510 is no longer properly functioning, the second array controller 2510 would seamlessly replace the first array controller 510 in the solar tracker control and communications network 2500 as to all the required communications and control functions. This redundancy in providing two array controllers 510, 2510 improves control system reliability. If one of the two array controllers 510, 2510 fails, the other of the two array monitors will perform all required control and communications functions, including sending weather related control signals 550 and operating data related control signals 555 to the solar tracker controllers, as described previously. In yet another alternative mode of operations of the solar tracker control and communications system 2500, both array controllers 510, 2510 may operate in a hybrid, limited overlapping, parallel manner, that is both controllers perform a limited set of specific, predetermined functions or tasks with respect to all of the plurality of solar tracker assemblies 100 of the solar tracker installation 1000, while at the same time performing specific functions or tasks for a subset of the plurality of solar tracker assemblies 100.

As previously described, each array controller, for example, array controller 510, includes the LoRa wireless communications gateway or bridge 512. Associated with the gateway 512 is an antenna 512*a* (FIG. 8). It is desirable to position the antenna 512*a* at high altitude positions within the solar tracker installation site 1002, for example, 5-20 feet above ground level. If a natural high elevation position (e.g., a small hill on the installation site 1002) exists within the site 1002, it should be used as the location for the antenna 512*a*, otherwise, if feasible, the antenna 512*a* may be mounted at the top of a tower or other such structure to provide for increased elevation. If a tower is used for the antenna 512a, generally, the tower would be located at a northern portion of the installation site 1000 to prevent the antenna tower from shading any of the photovoltaic modules 190 of the plurality of solar tracking assemblies 100.

In another aspect, the solar tracker and control communications system 2500 provides for direct wireless communications between a subset of weather sensors 703, for example, wind gust magnitude and wind direction weather sensors 702, 704 of the plurality of weather sensors 700, to the plurality of solar tracker controllers 600. This advantageously allows for individual solar tracker controllers to take rapid, remedial action to change the table angle of inclination as required of their associated solar tracker controllers, without the necessity of awaiting control signals from one or both of the array controllers 510, 2500. The subset of weather sensors 703 may include any number of the plurality of weather sensors 700, from a single weather sensor, such as weather sensor 702 to all of the weather sensors 702, 704, 706, 708, 710, 712, 714 of the plurality of weather sensors 700. High magnitude wind gusts, for example, are a continuing area of concern for large-scale solar tracker installations. High wind gust magnitudes in conjunction with a wind gust direction that is generally normal to the upper surfaces of the plurality of photovoltaic modules 190 of the solar tracker assemblies of the plurality of solar tracker assemblies 100 of the installation 1000 may require a rapid change in the table angles of inclination AI of some or all of the solar tracker assemblies of the plurality of solar tracker assembly 100 to avoid wind gust damage.

The wind gust problem is complicated because, in addition to wind gust magnitude, the direction of wind gusting is important in determining if a particular condition is of concern to a specific solar tracker assembly and thereby constitutes an out-of-bounds or out-of-range wind gust condition. Additionally, the particular table configuration, e.g., one-in-portrait vs. two-in-portrait, and the sizes of the photovoltaic modules also complicate the analysis because what may be a potentially damaging wind gust magnitude and direction (wind gust condition) for one solar tracker assembly of the solar tracker installation 1000 may not be problematic for another solar tracker assembly of the installation 1000. Because of the large installation site sizes (+100 acres) in large-scale solar tracker installation, there may be topographical and geographic variations across the installation site 1002, e.g., one subset of solar tracker assemblies may be at a higher altitude or in a more exposed position than other sets of solar tracker assemblies and, as such may be more exposed, to wind gust damage. Explanation of various photovoltaic module table configurations is found in U.S. Pub. No. US2023/0133308 A1 to Ballentine et al., published May 4, 2023. The '308 publication is assigned to the assignee of the present application and is incorporated by reference in its entirety herein.

By providing the individual solar tracker controllers, for example, solar tracker controller 602 of the plurality of solar tracker controllers 600 with, for example, wind condition weather data from the weather sensors 702, 704, individual solar tracker controllers may take rapid, remedial action to change the table angle of inclination AI of the solar tracker assemblies 102 if required, without the necessity of awaiting control signals the array controller, for example, array controller 510. Of course, this would require that each of the solar tracker controllers of the plurality of solar tracker controllers 600, for example, solar tracker controller 602 (FIG. 8) have requisite weather condition data analysis programming 602a, including appropriate values for weather condition data ranges 602b for the associated solar tracker assembly 102, to allow the controller 602 to recognize and appropriately respond to an out-of-range wind condition (magnitude and direction) 602c for its associated solar tracker assembly and then take appropriate remedial action, e.g., changing the table angle of inclination AI of its associated solar tracker assembly for a duration of the out-of-range wind condition or other predetermined time period, as set by the programming logic 602a.

Advantageously, this would allow precisely setting the out-of-range weather condition data range values 602b for what constitutes, for example, an out-of-range wind gust condition 602c for the particular solar tracker assembly 102 (or a set of similarly configured and located set of solar tracker assemblies, for example, the set of solar tracker assemblies 109, as discussed in the first embodiment) of the plurality of solar tracker assemblies 100. As mentioned above, because the plurality of solar tracker assemblies 100 are dispersed geographically over the extent of the installation site 1002, different solar tracker assemblies may have differing susceptibilities to wind gust damage. The ability to tailor weather condition data range values 602b individually for each solar tracker assembly, for example, solar tracker assembly 102, as to what constitutes, for example, an out-of-range wind gust condition 602c for that specific solar tracker assembly 102 is of great advantage. Similarly, it should be understood that other weather condition data received by a solar tracker controller may give rise to other out-of-bounds weather conditions 602c (snow presence, overcast sky condition, etc.) that would be acted upon by the solar tracker controller, for example, solar tracker controller 602, without input from the array controller 510. The wind gust condition explanation above is just one illustrative example. For example, if all of the plurality of weather sensors 700 are included in the subset of weather sensors 703 transmitting weather condition data to each of the plurality of solar tracker controllers 600, the solar tracker controllers 600 may be programmed to act on a variety of out-of-range weather conditions, in addition to the wind gust condition 602c described above. All such monitoring and responses by the plurality of solar tracker controllers 600 would advantageously be without involvement of the array controller, for example, array controller 510 associated with the solar tracker controllers 600.

To enhance the reliability of the solar tracker control and communications system 2500, each solar tracker assembly of the plurality of solar tracker assemblies 100 may communicate solar tracker data, including tracker identification data 650, tracker operating data 660, including tracker table angle of inclination data 670, as explained above, periodically, on a real time basis, to one or both of the array controllers 510, 2510 and to the cloud storage server 800 for storage in the cloud storage database 850. For each solar tracker assemblies of the plurality of solar tracker assemblies 100, for example the solar tracker assembly 102, the associate array controller, for example, array controller 510 would for periodically compare current status records 102a, 102b, 102c (comprising current solar tracker data) for the solar tracker assembly 102, as stored or held by: a) the array controller or monitor 510—current status record 102a; b) the array controller or monitor 2510—current status record 102b; and c) the cloud storage database 850—current status record 102c. If there are any differences in the three current status records, the three records 102a, 102b, 102c would be updated, as required, to reflect the most recent and most accurate solar tracker data for the solar tracker assembly 102. This may require that the array controller, for example, array controller 510 poll the solar tracker controller 602 associated with the solar tracker assembly 102 to confirm or correct the current solar tracker data for the solar tracker assembly.

The solar tracker and control and communications system 2500 further advantageously utilizes redundant telemetry (RD) 2501a and delay telemetry (DT) 2501b to enhance system reliability. Every time the table 100 of a solar tracker assembly, for example, solar tracker assembly 102, changes its table angle of inclination AI, the associated solar tracker controller 602 communicates to the array controller, for example, array controller 510, the current time, the tracker identification data 650, the tracker's current angle of inclination 670, and additional current tracker operating data 660. Additionally, with a large-scale solar tracker installation the number of solar tracker assemblies may be several hundred to several thousand. Given that a solar tracker table may pivot, during daylight hours, by one degree angle of inclination every three to five minutes, thousands of communications are being received by the array controller 510. If two or more communications are received by an array controller at the same time, a collision may occur, and one or more of the communications may be "dropped" and the data in the communication lost.

With redundant telemetry, each communication from the tracker controller 602 regarding tracker operating data 660 includes, not only the current values for the time, the current angle of inclination AI and other current tracker operating data, but, in addition, the communication includes, for example, the prior two previous data values from the prior two communications, that is, the communication would additionally include the data values for the last two changes to table angle of inclination AI. Thus, each communication by the tracker controller 602 would include current values of tracker operating data 660, along with the two most recent historical values of tracker operating data 660 for the solar tracker assembly 102. Thus, even if a given communication is lost, the subsequent communications will necessarily include the lost data values With delay telemetry, a predetermined delay is added before each solar tracker controller communication is sent to avoid collisions at the array controller, for example, array controller 510. By way of example, if the solar tracker installation 1000 includes 1,000 solar tracker assemblies and the time between tracker angle of inclination movements is 200 seconds, solar tracker controller 602 would be assigned a communication delay of 0.0002 seconds, solar tracker controller 604 would be assigned a communication delay of 0.0004 seconds and the one thousandth controller would be assigned a communication delay of 2.0000 seconds to avoid communications collisions at the array controller 510. This predetermined delay technique, of course, assumes that all the solar tracker controllers of the plurality of solar tracker controllers 600 would, otherwise, be sending their respective communications simultaneously and, thus, those 1,000 communications may be received simultaneously by the array controller 510. Another delay technique that could alternately be used for the delay telemetry 2501b, is to use a random number generator and use the random number generated and appropriately scaled, to determine the delay time for solar tracker communication delay times.

The foregoing processes of the solar tracker control and communications system 2500 provide for built-in redundancies for data and thereby enhance the reliability of the control system 2500 and, thus, the ability to operate the plurality of solar tracker assemblies 100 and associated solar tracker controllers 600 of the solar tracker installation 1000 for a longer period of time, for example, 24 hours or more, in the event of an internet failure that precludes communication of the array controllers 510, 2510 with the cloud storage database 850 via the cloud storage server 800.

The solar tracker control and communications system 2500 may advantageously include a browser-based application 904 for remote, web-based access to the control and communications system 2500 thereby allowing a remote user to both: a) control of each of the plurality of solar tracker assemblies of the plurality of solar tracker assemblies 100 of the solar tracker installation 1000; and b) monitor performance each of the plurality of solar tracker assemblies 100 of the solar tracker installation 1000. The browser-based application 904, in one example embodiment, is made accessible on a web site. A browser downloaded on a user's personal computer (PC) or other intelligent device (remote devices 900) accesses the website via a monitoring portal. Utilizing the browser and the associated application 904, a remote user can view how the solar tracker assemblies are performing, that is, perform performance monitoring by data stored in the cloud storage database 850, for example, tracker operating data 560, tracker maintenance data 570, and weather condition data 580. Additionally and advantageously, the browser-based application 904 also permits the user, through the cloud storage server 800, the array controller or controllers 510, 2510, and the plurality of solar tracker controllers 602 to control operation of one or more of the plurality of solar tracker assemblies 100, for example, solar tracker assembly 102. By way of example, tracker operating data 560 indicates that the drive mechanism 150 is using an unacceptably high level of current to pivot the table 110, this may be an indication that the motor 180 is nearing the end of its useful life or that mechanical problems are making it difficult to pivot the table 110. The remote user recognizing this issue from utilization of the application 904, may then immediately send control commands via the application 904 to move the solar tacker assembly 102 to a shut down mode until a technician can visit the installation site 1002 and determine the exact nature of the problem. Alternately, as previously described, tracker operating data 560 may be sent from the array controller 510 to the SCADA system 950.

As used herein, terms of orientation and/or direction such as upward, downward, forward, rearward, upper, lower, inward, outward, inwardly, outwardly, horizontal, horizontally, vertical, vertically, distal, proximal, axially, radially, etc., are provided for convenience purposes and relate generally to the orientation shown in the Figures and/or discussed in the Detailed Description. Such orientation/direction terms are not intended to limit the scope of the present disclosure, this application and the invention or inventions described therein, or the claims appended hereto.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A solar tracker control system for a solar tracker installation located on an installation site, the solar tracker installation including a plurality of solar tracker assemblies, each of the plurality of solar tracker assemblies including a table supporting a plurality of photovoltaic modules, the table being rotatable through an angle of inclination range and a drive mechanism coupled to the table for changing a table angle of inclination, the solar tracker control system comprising:
- a) a plurality of solar tracker controllers, each solar tracker controller of the plurality of solar tracker controllers associated with a respective different one of the plurality of solar tracker assemblies, each solar tracker controller of the plurality of solar tracker controllers including an actuator for changing a table angle of inclination of the associated solar tracker assembly by actuating a drive mechanism of the associated solar tracker assembly;
- b) one or more weather sensors periodically wirelessly communicating weather condition data to each solar tracker controller of the plurality of solar tracker controllers;
- c) an array controller in wireless communications with each solar tracker controller of the plurality of solar tracker controllers;
- d) each solar tracker controller of the plurality of solar tracker controllers wirelessly communicating table angle of inclination data of the associated solar tracker assembly to the array controller; and
- e) each solar tracker controller of the plurality of solar tracker controllers analyzing the weather condition data and, if an out-of-range weather condition is determined for the associated solar tracker assembly, the solar tracker controller changing the table angle of inclination of the associated solar tracker assembly.

2. The solar tracker control system of claim 1 wherein each solar tracker controller of the plurality of solar tracker controllers includes a weather condition data analysis program that is utilized in analyzing the weather condition data and determining if an out-or-range weather condition exists for the associated solar tracker assembly.

3. The solar tracker control system of claim 2 wherein each solar tracker controller of the plurality of solar tracker controllers includes weather condition data range values that are utilized in analyzing the weather condition data and determining if an out-or-range weather condition exists for the associated solar tracker assembly, the weather condition data range varying depending on characteristics of the table of the associated solar tracker assembly.

4. The solar tracker control system of claim 1 wherein the array controller wirelessly communicates control signals to the one or more solar tracker controllers of the plurality of solar tracker controllers to change the table angle of inclination of the one or more solar tracker assemblies of the plurality of solar tracker assemblies associated with the one or more solar tracker controllers to account for an out-of-range operating condition or out-of-range weather condition.

5. The solar tracker control system of claim 1 wherein the array controller: i) periodically receiving tracker operating data, including the table angle of inclination data, transmitted by each solar tracker controller of the plurality of solar tracker controllers for each solar tracker controller's associated solar tracker assembly of the plurality of solar tracker assemblies; and ii) analyzing the tracker operating data and, if one or more operating data values for a specific solar tracker assembly indicates an out-of-range operating condition, transmitting control signals to the solar tracker controller associated with the specific solar tracker assembly to change the table angle of inclination of the specific solar tracker assembly to a maintenance position.

6. The solar tracker control system of claim 1 wherein the one or more weather sensors are part of a plurality of weather sensors and the array controller: i) periodically receiving weather condition data from each of the plurality of weather sensors; and ii) analyzing the weather condition data and, if an out-of-range weather condition is identified, determining a portion of the installation site that is affected by the out-of-range weather condition, and transmitting control signals to selected solar tracker assembly controllers located within the portion of the installation site that is affected by the out-of-range weather condition to change the table angle of inclination of the solar tracker assemblies associated with the selected solar tracker controllers.

7. The solar tracker control system of claim 1 wherein the solar tracker controller is powered by a dedicated photovoltaic module mounted to the table of its associated solar tracker assembly and the actuator of the solar tracker controller comprises a motor driver for driving a motor of the drive mechanism to effect a change of the table angle of inclination the associate solar tracker assembly.

8. The solar tracker control system of claim 1 further including a cloud storage server accessing a cloud storage device for storing and retrieving data, the array controller: i) periodically receiving weather condition data from each of the one or more weather sensors; ii) periodically receiving tracker operating data transmitted by each solar tracker controller of the plurality of solar tracker controllers for each solar tracker controller's associated solar tracker assembly of the plurality of solar tracker assemblies; iii) transmitting selected tracker operating data for each of the plurality of solar tracker assemblies to the cloud storage server to provide remote access to the selected tracker operating data; and iv) transmitting selected weather condition data to the cloud storage server to provide remote access to the selected weather condition data.

9. The solar tracker control system of claim 6 wherein the wireless communications between the array controller and each solar tracker controller of the plurality of solar tracker controllers and between the array controller and each of the one or more weather sensors utilizes sub-gigahertz wireless communications.

10. The solar tracker control system of claim 1 wherein the wireless communications between the array controller and each solar tracker controller of the plurality of solar tracker controllers and between the array controller and each of the one or more weather sensors utilizes a LoRa wireless communications protocol.

11. The solar tracker control system of claim 1 wherein the array controller, each of the solar tracker controllers of the plurality of solar tracker controllers, and each of the one or more weather sensors includes a LoRa wireless communications device for wireless communications.

12. The solar tracker control system of claim 8 wherein a web-based application accessing the cloud storage device via the cloud storage server and a browser installed on a remote device allow for remote user control of respective angles of inclination of each of the plurality of solar tracker assemblies of the plurality of solar tracker assemblies and access to tracker operating data via the remote device.

13. The solar tracker control system of claim 1 wherein the array controller includes a first array controller and a second array controller.

14. A solar tracker control system for a solar tracker installation located on an installation site, the solar tracker installation including a plurality of solar tracker assemblies, each of the plurality of solar tracker assemblies including a table supporting a plurality of photovoltaic modules, the table being rotatable through an angle of inclination range and a drive mechanism coupled to the table for changing a table angle of inclination, the solar tracker control system comprising:
  a) a plurality of solar tracker controllers, each solar tracker controller of the plurality of solar tracker controllers associated with a respective different one of the plurality of solar tracker assemblies, each solar tracker controller of the plurality of solar tracker controllers including an actuator for changing a table angle of inclination of the associated solar tracker assembly by actuating a drive mechanism of the associated solar tracker assembly, each solar tracker controller of the plurality of solar tracker controllers periodically transmitting tracker operating data for the associated solar tracker assembly;
  b) one or more weather sensors periodically transmitting weather condition data to each solar tracker controller of the plurality of solar tracker controllers;
  c) an array controller in wireless communications with each solar tracker controller of the plurality of solar tracker controllers;
  d) each solar tracker controller of the plurality of solar tracker controllers wirelessly communicating tracker operating data of the associated solar tracker assembly to the array controller; and
  e) each solar tracker controller of the plurality of solar tracker controllers analyzing the weather condition data and, if an out-of-range weather condition is determined for the associated solar tracker assembly, the solar tracker controller changing the table angle of inclination of the associated solar tracker assembly.

15. The solar tracker control system of claim 14 wherein each solar tracker controller of the plurality of solar tracker controllers includes a weather condition data analysis program that is utilized in analyzing the weather condition data and determining if an out-or-range weather condition exists for the associated solar tracker assembly.

16. The solar tracker control system of claim 15 wherein each solar tracker controller of the plurality of solar tracker controllers includes weather condition data range values that are utilized in analyzing the weather condition data and determining if an out-of-range weather condition exists for the associated solar tracker assembly, the weather condition data range varying depending on characteristics of the table of the associated solar tracker assembly.

17. The solar tracker control system of claim 14 wherein the array controller wirelessly communicates control signals to the one or more solar tracker controllers of the plurality of solar tracker controllers to change the table angle of inclination of the one or more solar tracker assemblies of the plurality of solar tracker assemblies associated with the one or more solar tracker controllers to account for an out-of-range operating condition or out-of-range weather condition.

18. The solar tracker control system of claim 14 wherein the array controller: i) periodically receiving the tracker operating data transmitted by each solar tracker controller of the plurality of solar tracker controllers for each solar tracker controller's associated solar tracker assembly of the plurality of solar tracker assemblies; and ii) analyzing the tracker operating data and, if one or more operating data values for a specific solar tracker assembly indicates an out-of-range operating condition, transmitting control signals to the solar tracker controller associated with the specific solar tracker assembly to change the table angle of inclination of the specific solar tracker assembly to a maintenance position.

19. The solar tracker control system of claim 14 wherein the one or more weather sensors are part of a plurality of weather sensors and the array controller: i) periodically receiving weather condition data from each of the plurality of weather sensors; and ii) analyzing the weather condition data and, if an out-of-range weather condition is identified, determining a portion of the installation site that is affected by the out-of-range weather condition, and transmitting control signals to selected solar tracker assembly controllers located within the portion of the installation site that is affected by the out-of-range weather condition to change the table angle of inclination of the solar tracker assemblies associated with the selected solar tracker controllers.

20. The solar tracker control system of claim 14 further including a cloud storage server accessing a cloud storage device for storing and retrieving data, the array controller: i) periodically receiving weather condition data from each of the one or more weather sensors; ii) periodically receiving tracker operating data transmitted by each solar tracker controller of the plurality of solar tracker controllers for each solar tracker controller's associated solar tracker assembly of the plurality of solar tracker assemblies; iii) transmitting selected tracker operating data for each of the plurality of solar tracker assemblies to the cloud storage server to provide remote access to the selected tracker operating data; and iv) transmitting selected weather condition data to the cloud storage server to provide remote access to the selected weather condition data.

21. The solar tracker control system of claim 19 wherein the wireless communications between the array controller and each solar tracker controller of the plurality of solar tracker controllers and between the array controller and each of the one or more weather sensors utilizes sub-gigahertz wireless communications.

22. The solar tracker control system of claim 20 wherein a web-based application accessing the cloud storage device via the cloud storage server and a browser installed on a remote device allow for remote user control of respective angles of inclination of each of the plurality of solar tracker assemblies of the plurality of solar tracker assemblies and access to tracker operating data via the remote device.

23. The solar tracker control system of claim 14 wherein the array controller includes a first array controller and a second array controller.

24. A solar tracker control system for a solar tracker installation located on an installation site, the solar tracker installation including a plurality of solar tracker assemblies, each of the plurality of solar tracker assemblies including a table supporting a plurality of photovoltaic modules, the table being rotatable through an angle of inclination range and a drive mechanism coupled to the table for changing a table angle of inclination, the solar tracker control system comprising:
  a) a plurality of solar tracker controllers, each solar tracker controller of the plurality of solar tracker controllers being associated with a respective different one of the plurality of solar tracker assemblies, a solar tracker assembly of the plurality of solar tracker assemblies actuating a drive mechanism of its associated solar tracker assembly to change a table angle of inclination of the associated solar tracker assembly;
  b) one or more weather sensors communicating weather condition data to one or more solar tracker controllers of the plurality of solar tracker controllers; and
  c) each solar tracker controller of the plurality of solar tracker controllers analyzing the weather condition data and, if an out-of-range weather condition is determined for the associated solar tracker assembly, the solar tracker controller changing the table angle of inclination of the associated solar tracker assembly.

25. The solar tracker control system of claim 24 wherein the one or more weather sensors periodically wirelessly communicate weather condition data to the one or more solar tracker controllers of the plurality of solar tracker controllers.

26. The solar tracker control system of claim 24 further including an array controller in wireless communications with each solar tracker controller of the plurality of solar tracker controllers.

27. The solar tracker control system of claim 26 wherein each solar tracker controller of the plurality of solar tracker controllers wirelessly communicates table angle of inclination data of the associated solar tracker assembly to the array controller.

28. The solar tracker control system of claim 24 wherein each solar tracker controller of the plurality of solar tracker controllers includes a weather condition data analysis program that is utilized in analyzing the weather condition data and determining if an out-of-range weather condition exists for the associated solar tracker assembly.

29. The solar tracker control system of claim 24 wherein each solar tracker controller of the plurality of solar tracker controllers wirelessly communicates tracker operating data of the associated solar tracker assembly to the array controller.

\* \* \* \* \*